US012739557B2

(12) United States Patent
Kim et al.

(10) Patent No.: US 12,739,557 B2
(45) Date of Patent: Sep. 15, 2026

(54) ELECTRONIC APPARATUS AND CONTROLLING METHOD THEREOF

(71) Applicant: Samsung Electronics Co., Ltd., Suwon-si (KR)

(72) Inventors: Dongyoon Kim, Suwon-si (KR); Jongbae Kim, Suwon-si (KR); Kisung Lee, Suwon-si (KR); Hoseok Wey, Suwon-si (KR); Yoonjae Lee, Suwon-si (KR); Yongseok Jang, Suwon-si (KR); Woosung Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 18/812,497

(22) Filed: Aug. 22, 2024

(65) Prior Publication Data

US 2025/0126400 A1 Apr. 17, 2025

Related U.S. Application Data

(63) Continuation of application No. PCT/KR2024/010644, filed on Jul. 23, 2024.

(30) Foreign Application Priority Data

Oct. 16, 2023 (KR) ........................ 10-2023-0137719

(51) Int. Cl.

*H04R 1/10* (2026.01)
*G06F 3/16* (2006.01)

(52) U.S. Cl.

CPC ........... *H04R 1/1083* (2013.01); *G06F 3/162* (2013.01); *H04R 1/1016* (2013.01)

(58) Field of Classification Search

CPC ................ H04R 1/1083; H04R 1/1016; H04R 2460/01; G06F 3/162; G10L 21/0208;

(Continued)

(56) References Cited

U.S. PATENT DOCUMENTS

| | | | |
|---|---|---|---|
| 7,368,652 | B2 | 5/2008 | Iketani et al. |
| 8,804,976 | B2 | 8/2014 | Tsunoo et al. |

(Continued)

FOREIGN PATENT DOCUMENTS

| | | | |
|---|---|---|---|
| CN | 115278437 | A | 11/2022 |
| JP | 2008092363 | A | 4/2008 |

(Continued)

OTHER PUBLICATIONS

PCT Search Report dated Oct. 22, 2024 for PCT/KR2024/010644.

(Continued)

*Primary Examiner* — Norman Yu
(74) *Attorney, Agent, or Firm* — Nixon & Vanderhye P.C.

(57) ABSTRACT

An electronic apparatus may include a memory, a communication interface configured to perform communication with an external server and at least one processor including processing circuitry, and the at least one processor may be configured to obtain audio data for ambient sound, obtain a target audio signal of a preset type from the audio data, obtain sound quality information of the target audio signal, based on the sound quality information being not equal to or greater than a threshold grade, transmit the target audio signal to the external server through the communication interface, receive a source audio signal corresponding to the target audio signal from the external server through the communication interface, identify a playback time of the source audio signal based on the target audio signal, and provide a synthesized audio signal in which an inversion signal corresponding to the audio data and the source audio signal are synthesized based on the playback time.

15 Claims, 21 Drawing Sheets

(58) Field of Classification Search
CPC ............. G10K 11/1781; G10K 11/175; G10K 11/178; G10K 11/17823
USPC ......................................... 381/98, 97, 56, 58
See application file for complete search history.

(56) References Cited

U.S. PATENT DOCUMENTS

| | | | |
|---|---|---|---|
| 11,250,870 | B2 | 2/2022 | Lee et al. |
| 11,562,763 | B2 | 1/2023 | Lee et al. |
| 11,763,799 | B2 | 9/2023 | Park et al. |
| 2011/0142268 | A1 | 6/2011 | Iwakuni et al. |
| 2015/0100144 | A1 | 4/2015 | Lee et al. |
| 2021/0249030 | A1* | 8/2021 | Lee ..................... G10L 21/0232 |
| 2022/0301565 | A1 | 9/2022 | Mese et al. |

FOREIGN PATENT DOCUMENTS

| | | | |
|---|---|---|---|
| JP | 2012134715 | A | 7/2012 |
| JP | 2013-110579 | A | 6/2013 |
| KR | 10-2012-0050155 | A | 5/2012 |
| KR | 10-2013-0133717 | A | 12/2013 |
| KR | 20170027760 | A | 3/2017 |
| KR | 10-2020-0072196 | A | 6/2020 |
| KR | 10-2021-0101644 | A | 8/2021 |
| KR | 10-2021-0101670 | A | 8/2021 |
| KR | 10-2022-0064871 | A | 5/2022 |

OTHER PUBLICATIONS

PCT Written Opinion dated Oct. 22, 2024 for PCT/KR2024/010644.

Extended European Search Report dated Mar. 20, 2026 for EP Application No. 24879895.1.

* cited by examiner

FIG. 9

| GRADE CRITERIA OF SOUND QUALITY INFORMATION | | |
|---|---|---|
| | SIGNAL-TO-NOISE RATIO (SNR) | RECOGNITION RATE |
| FIRST GRADE | OVER 20dB | EQUAL TO OR GREATER THAN 90% |
| SECOND GRADE | EQUAL TO OR LESS THAN 10dB~20dB | EQUAL TO OR LESS THAN 70~90% |
| THIRD GRADE | EQUAL TO OR LESS THAN 10dB | EQUAL TO OR LESS THAN 70% |

900

ELECTRONIC APPARATUS AND CONTROLLING METHOD THEREOF

CROSS-REFERENCE TO RELATED APPLICATIONS

This application is a continuation application of International Application No. PCT/KR2024/010644 designating the United States, filed on Jul. 23, 2024, in the Korean Intellectual Property Receiving Office and claiming priority to Korean Patent Application No. 10-2023-0137719, filed on Oct. 16, 2023, in the Korean Intellectual Property Office, the disclosures of which are all hereby incorporated by reference herein in their entireties.

BACKGROUND

Technical Field

Certain example embodiments relate to an electronic apparatus and a controlling method thereof, and for example, to an electronic apparatus that provides a noise canceling function and/or a controlling method thereof.

Description of Related Art

Noise canceling is a function that removes or reduces unwanted ambient noise from your environment. A user may set which signals are considered noise. Depending on a user setting or a preset method, sound that is determined to be noise may be attenuated (or removed) by a noise canceling function.

However, if the user wants to hear only a targeted portion of the sound excluding a noise portion of the sound measured in the surrounding environment, there is a problem of poor sound quality. This is because the noise may not be completely removed depending on the performance of the noise filtering function.

If the targeted portion is output while the noise is not completely removed, the user may feel that he or she is listening to low-quality audio.

An electronic apparatus 100 may recognize audio being collected from the surrounding environment and provide audio search results. The search results may include information indicating which music or content the collected audio corresponds to.

When playing retrieved content while performing the noise canceling function, ambient sound that is not completely removed can be heard along with the content, which may cause inconvenience to the user.

SUMMARY

Certain example embodiments improve the above-described problem, to measure ambient sound to obtain a target audio signal desired by the user and to determine whether to receive a source audio signal from an external server by considering the quality of the target audio signal.

An electronic apparatus according to an example embodiment may include a memory, a communication interface comprising communication circuitry configured to perform communication with an external server, and at least one processor comprising processing circuitry, wherein the at least one processor is individually and/or collectively configured to obtain audio data for ambient sound, obtain a target audio signal of a preset type from the audio data, obtain sound quality information of the target audio signal, based on the sound quality information being not equal to or greater than a threshold grade, transmit the target audio signal to the external server through the communication interface, receive a source audio signal corresponding to the target audio signal from the external server through the communication interface, identify a playback time of the source audio signal based on the target audio signal, and provide a synthesized audio signal in which an inversion signal corresponding to the audio data and the source audio signal are synthesized based on the playback time.

The at least one processor may be configured to obtain the target audio signal and a noise signal from the audio data, obtain a Signal-to-Noise Ratio (SNR) based on the target audio signal and the noise signal, and obtain the sound quality information based on the Signal-to-Noise Ratio (SNR).

The at least one processor may be configured to, based on the Signal-to-Noise Ratio (SNR) being less than a threshold value, transmit the target audio signal to the external server through the communication interface.

The at least one processor may be configured to determine a sound quality grade of the first audio signal based on the Signal-to-Noise Ratio (SNR) and a grade table for sound quality stored in the memory, and obtain the sound quality information including the sound quality grade.

The at least one processor may be configured to obtain the inversion signal by inversing a phase of a signal included in the audio data to attenuate the ambient sound.

The at least one processor may be configured to determine the playback time of the source audio signal by comparing a waveform of the target audio signal and a waveform of the source audio signal, obtain the synthesized audio signal by synthesizing the inversion signal and an area corresponding to the playback time among an entire area of the source audio signal, and provide the synthesized audio signal.

The at least one processor may be configured to transmit the synthesized audio signal to an external sound device through the communication interface.

The external sound device may be a wireless earphone or a wireless headphone, and the at least one processor may be configured to transmit the synthesized audio signal to the external sound device via a Bluetooth communication module, comprising Bluetooth communication circuitry, included in the communication interface.

The synthesized audio signal may be a first synthesized audio signal, and the at least one processor may be configured to, based on the sound quality information being equal to or greater than a threshold grade, obtain a second synthesized audio signal in which the inversion signal corresponding to the audio data and the target audio signal are synthesized, and provide the second synthesized audio signal.

The at least one processor may be configured to, based on an output method of the target audio signal being a mono type, obtain a conversion signal by converting the target audio signal to a stereo type, and obtain the second synthesized audio signal by synthesizing the conversion signal and the inversion signal.

A controlling method of an electronic apparatus that performs communication with an external server according to an example embodiment may include obtaining audio data for ambient sound, obtaining a target audio signal of a preset type from the audio data, obtaining sound quality information of the target audio signal, based on the sound quality information being not equal to or greater than a threshold grade, transmitting the target audio signal to the external server, receiving a source audio signal corresponding to the target audio signal from the external server, identifying a playback time of the source audio signal based on the target audio signal, and providing a synthesized audio signal in which an inversion signal corresponding to the audio data and the source audio signal are synthesized based on the playback time.

The obtaining sound quality information may include obtaining the target audio signal and a noise signal from the audio data, obtaining a Signal-to-Noise Ratio (SNR) based on the target audio signal and the noise signal, and obtaining the sound quality information based on the Signal-to-Noise Ratio (SNR).

The transmitting the target audio signal to the external server may include, based on the Signal-to-Noise Ratio (SNR) being less than a threshold value, transmitting the target audio signal to the external server.

The obtaining sound quality information may include determining a sound quality grade of the first audio signal based on the Signal-to-Noise Ratio (SNR) and a grade table for sound quality stored in the electronic apparatus, and obtaining the sound quality information including the sound quality grade.

The method may further include obtaining the inversion signal by inversing a phase of a signal included in the audio data to attenuate the ambient sound.

The providing a synthesized signal may include determining the playback time of the source audio signal by comparing a waveform of the target audio signal and a waveform of the source audio signal, obtaining the synthesized audio signal by synthesizing the inversion signal and an area corresponding to the playback time among an entire area of the source audio signal, and providing the synthesized audio signal.

The controlling method may further include transmitting the synthesized audio signal to an external sound device.

The external sound device may be a wireless earphone or a wireless headphone, and the transmitting the synthesized audio signal to the external sound device may include transmitting the synthesized audio signal to the external sound device through a Bluetooth communication module included in the electronic apparatus.

The synthesized audio signal may be a first synthesized audio signal, and the controlling method may further include, based on the sound quality information being equal to or greater than a threshold grade, obtain a second synthesized audio signal in which the inversion signal corresponding to the audio data and the target audio signal are synthesized, and providing the second synthesized audio signal.

The controlling method may further include, based on an output method of the target audio signal being a mono type, obtaining a conversion signal by converting the target audio signal to a stereo type, and the obtaining the second synthesized signal may include obtaining the second synthesized audio signal by synthesizing the conversion signal and the inversion signal.

BRIEF DESCRIPTION OF DRAWINGS

FIG. 9 is a view provided to explain grade criteria of sound quality information according to an example embodiment;

DETAILED DESCRIPTION

Figure 1:
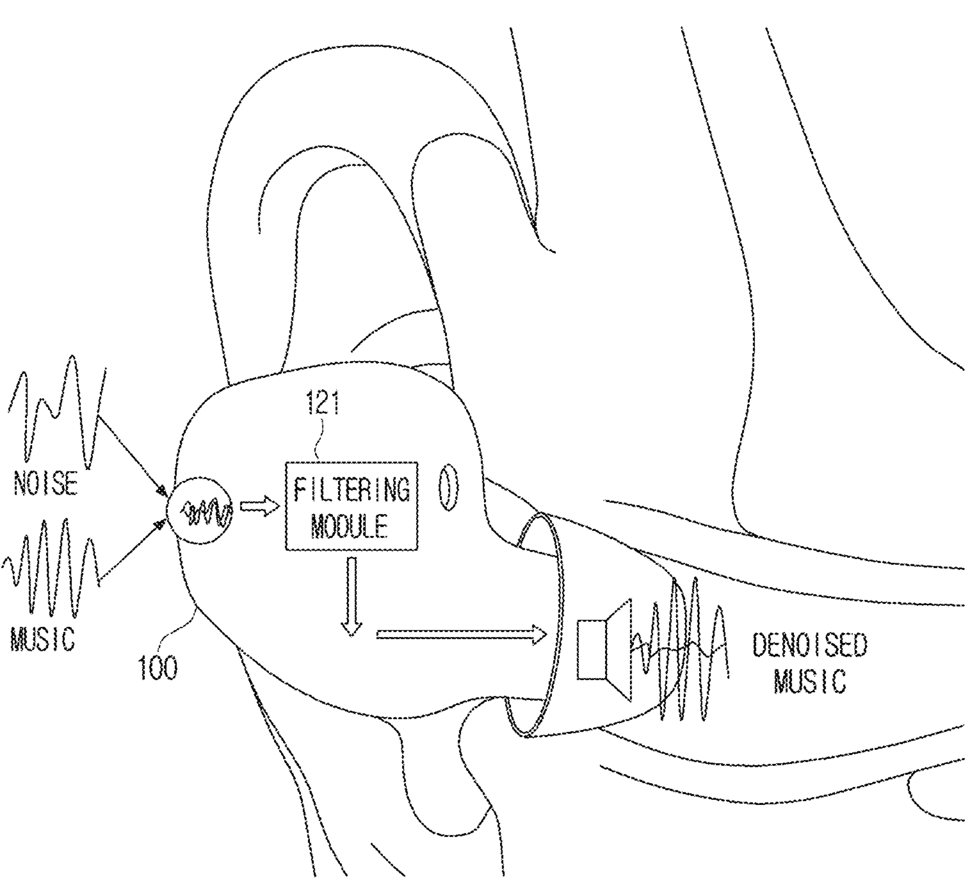
FIG. 1 is a view provided to explain a noise canceling function according to an example embodiment.

Hereinafter, the disclosure is described in detail with reference to the accompanying drawings.

General terms that are currently widely used are selected as the terms used in embodiments of the disclosure in consideration of their functions in the disclosure, and may be changed based on the intention of those skilled in the art or a judicial precedent, the emergence of a new technique, or the like. In addition, in a specific case, terms arbitrarily chosen by an applicant may exist. In this case, the meanings of such terms are mentioned in detail in corresponding descriptions of the disclosure. Therefore, the terms used in the embodiments of the disclosure need to be defined on the basis of the meanings of the terms and the contents throughout the disclosure rather than simple names of the terms.

In the disclosure, an expression "have", "may have", "include", "may include" or the like, indicates the existence of a corresponding feature (for example, a numerical value, a function, an operation or a component such as a part), and does not exclude the existence of an additional feature.

An expression, "at least one of A or/and B" should be understood as indicating any one of "A", "B" and "both of A and B."

Expressions "1st", "2nd", "first", "second", and the like, used in the disclosure may indicate various components regardless of the sequence and/or importance of the components. These expressions are used only to distinguish one component from another component, and do not limit the corresponding components.

In case that any component (for example, a first component) is mentioned to be "(operatively or communicatively) coupled with/to" or "connected to" another component (for example, a second component), it is to be understood that any component is directly coupled to another component or may be coupled to another component through at least another component(s) (for example, a third component).

A term of a singular number may include its plural number unless explicitly indicated otherwise in the context. It is to be understood that a term "include", "formed of", or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor (not shown) except for a "module" or an "~er/or" that needs to be implemented by specific hardware. Thus, each "module" herein may comprise circuitry.

In the disclosure, a term 'user' may refer to a person using an electronic apparatus or a device using an electronic apparatus (e.g., an artificial intelligence electronic apparatus).

Hereinafter, the present disclosure will be described in greater detail with reference to the accompanying drawings.

FIG. 1 is a view provided to explain a noise canceling function according to an embodiment.

Referring to FIG. 1, an electronic apparatus 100 may perform a noise canceling mode. The noise canceling mode may be a mode that attenuates (or filters) a signal that is set to be a target noise signal. The electronic apparatus 100 may receive ambient sound (noise, music). The electronic apparatus 100 may include a filtering module 121. The electronic apparatus 100 may remove noise from the ambient sound through the filtering module 121. The electronic apparatus 100 may provide a de-noised audio signal.

The filtering module 121, comprising filtering circuitry, may be described as a noise filtering module, a sound filtering module, or the like.

According to an embodiment, the electronic apparatus 100 may remove only noise from the ambient sound. The electronic apparatus 100 may provide music included in the ambient sound as it is.

According to an embodiment, the electronic apparatus 100 may obtain high-quality music data corresponding to music (low quality) from ambient sound. The electronic apparatus 100 may filter (block, attenuate or cancel) all of the ambient sound (low quality music, noise) and provide the high-quality music data.

Figure 2:
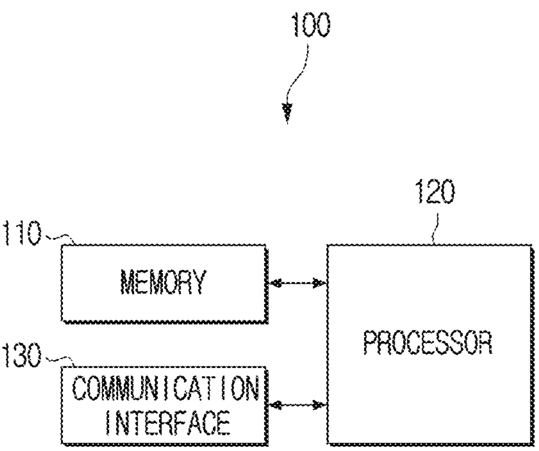
FIG. 2 is a block diagram illustrating an electronic apparatus according to an example embodiment.

FIG. 2 is a block diagram illustrating the electronic apparatus 100 according to an embodiment.

Referring to FIG. 2, the electronic apparatus 100 may include at least one of a memory 110, at least one processor 120, or a communication interface 130.

The memory 110 may store a grade table for sound quality. This will be described with reference to FIG. 9.

Figure 18:
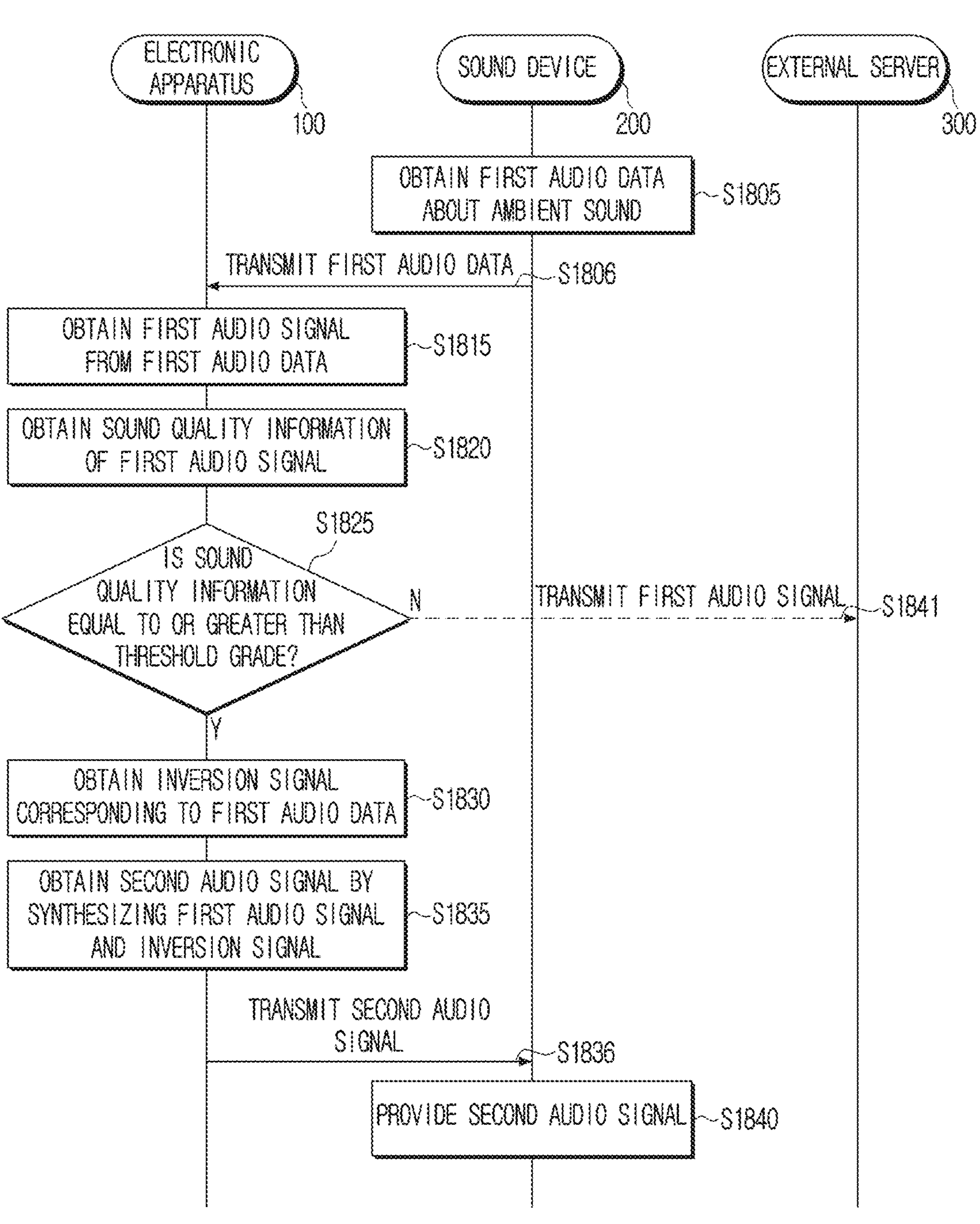
FIG. 18 is a view provided to explain an operation of providing an audio signal using a sound device according to an example embodiment.
Figure 19:
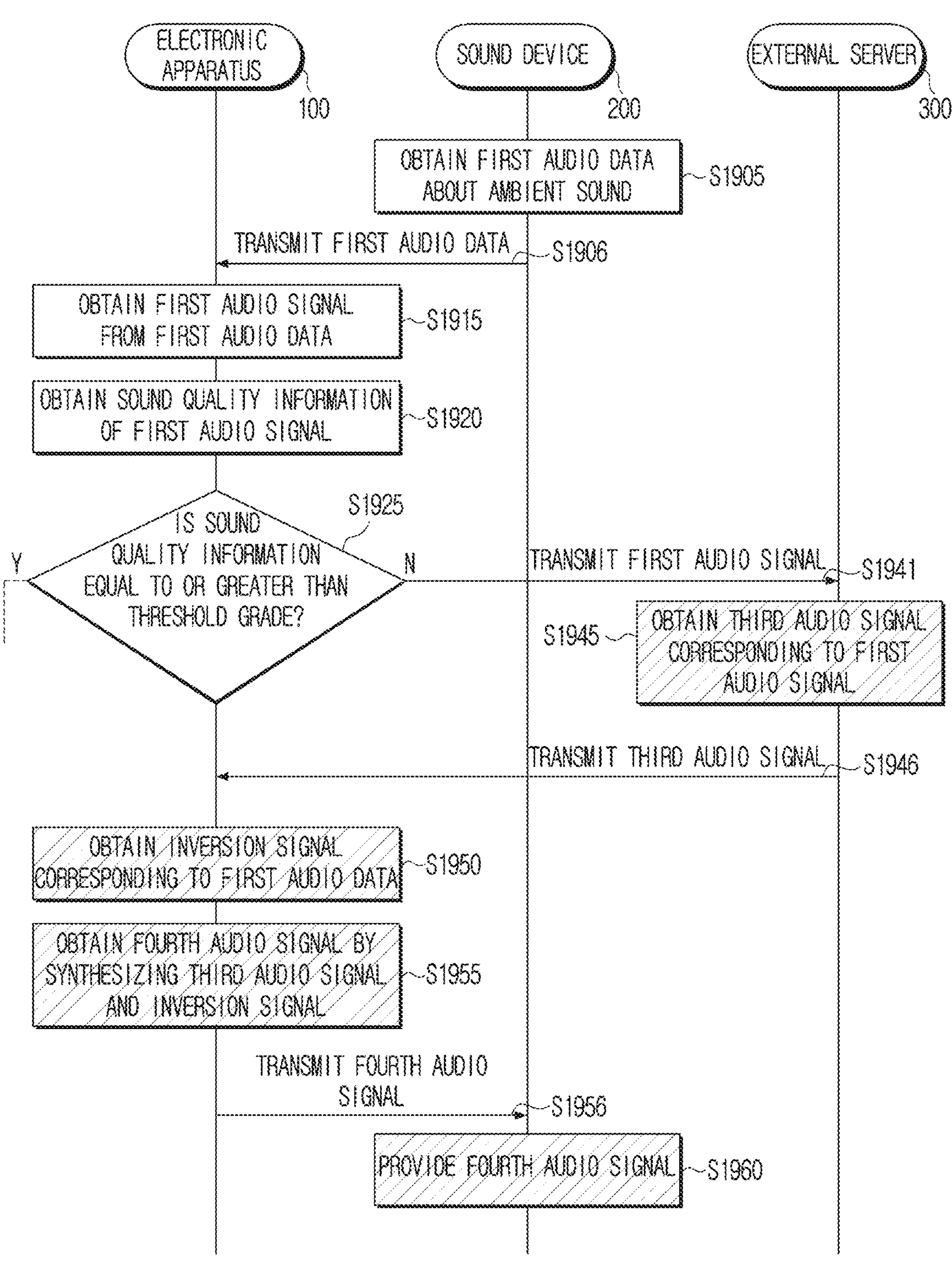
FIG. 19 is a view provided to explain an operation of providing an audio signal using a sound device according to an example embodiment.
Figure 20:
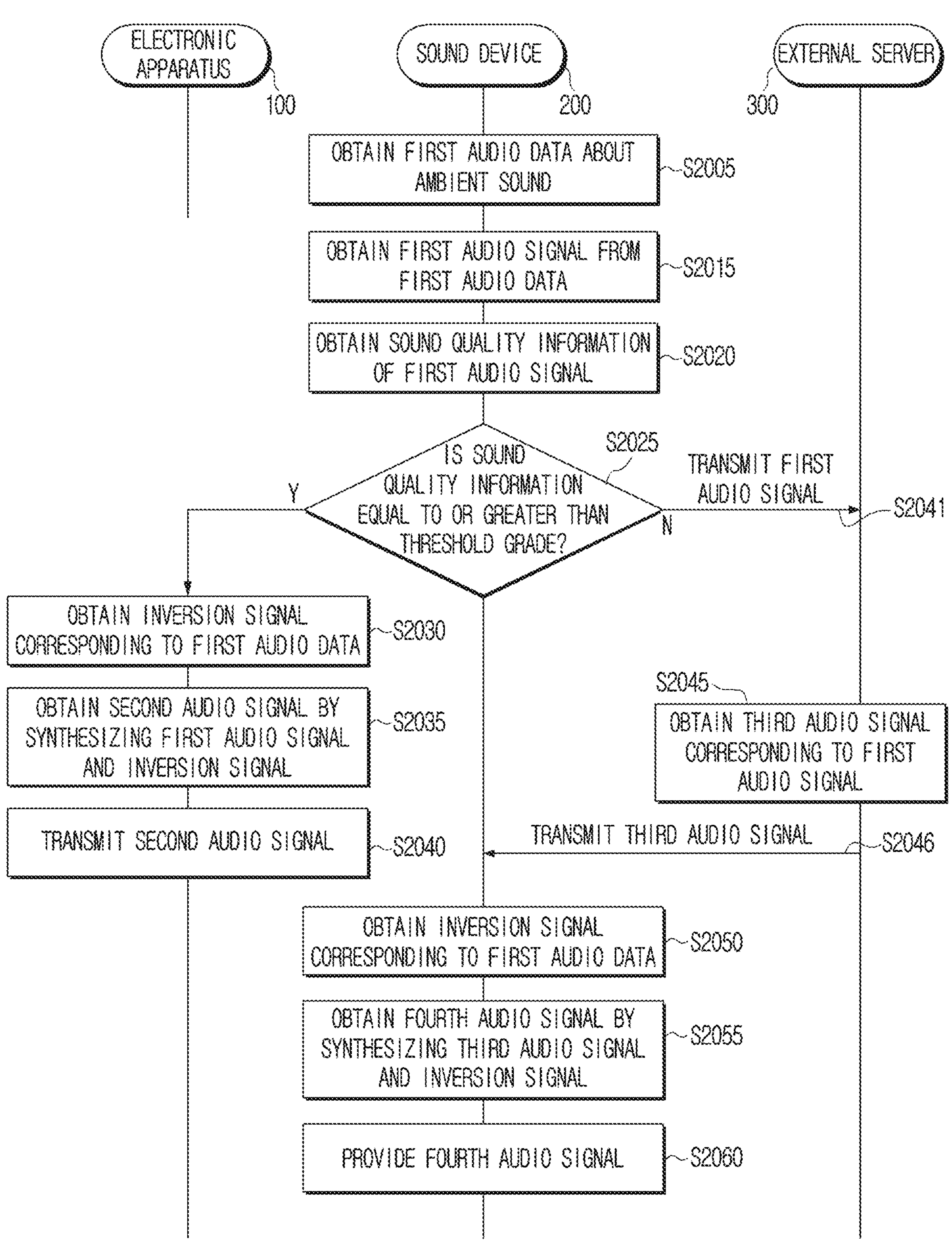
FIG. 20 is a view provided to explain an operation of providing an audio signal using a sound device according to an example embodiment.

The communication interface 130 may be coupled, directly or indirectly, to an external sound device 200 or an external server 300 (e.g., see 200 and 300 in FIGS. 18-20).

The electronic apparatus 100 may be an electronic blackboard, a television, a desktop PC, a laptop, a smartphone, a tablet PC, a server, or the like. The examples described above are only for illustrative purposes of the electronic apparatus, and are not necessarily limited to the electronic apparatus described above.

The at least one processor 120 may perform overall control operations of the electronic apparatus 100. The at least one processor 120 may perform a function that controls the overall operations of the electronic apparatus 100.

The at least one processor 120 may obtain audio data (first audio data) about the ambient sound, obtain a target audio signal (first audio signal) of a preset type from the audio data, obtain sound quality information of the target audio signal, and, when the sound quality information is not equal to or greater than a threshold grade, transmit the target audio signal to an external server through the communication interface 130, receive a source audio signal (third audio signal) corresponding to the target audio signal from the external server through the communication interface 130, identify a playback time of the source audio signal based on the target audio signal, and provide a synthesized audio signal (fourth audio signal) in which an inversion signal corresponding to the audio data and the source audio signal are synthesized based on the playback time.

The at least one processor 120 may obtain audio data about ambient sound.

According to an embodiment, the at least one processor 120 may receive audio data that is a recording of ambient sound. The at least one processor 120 may receive the audio data from the external sound device 200 through the communication interface 130. The external sound device 200 will be described with reference to FIGS. 18 to 20.

According to an embodiment, the electronic apparatus 100 may include a microphone 180, and the at least one processor 120 may record ambient sound through the microphone 180. The at least one processor 120 may obtain audio data about the ambient sound through the microphone 180.

The at least one processor 120 may determine whether the audio data includes a target audio signal of a preset type. The at least one processor 120 may identify the target audio signal of the preset type by analyzing the audio data.

The at least one processor 120 may obtain an audio signal included in the audio data. The at least one processor 120 may obtain feature information of the audio data, and determine whether the audio data includes an audio signal of a preset type based on the feature information of the audio data.

The audio data may include data in which a plurality of signals are mixed. The at least one processor 120 may obtain feature information including at least one of a frequency spectrum, frequency band energy, spectral average, spectral analysis, energy change information, amplitude change information, and period change information of the audio data. Based on the feature information, the at least one processor 120 may determine whether a signal of a preset type is present among the plurality of signals included in the audio data.

The preset type may include any content type that includes audio. For example, the preset type may include video content, music content, etc. that includes audio. The preset type may be described as a target type, a target category, a preset category, etc.

The at least one processor 120 may obtain a target audio signal of a preset type from the audio data. The audio data may include a plurality of audio signals. The at least one processor 120 may identify (or extract) a target audio signal of a preset type from the plurality of audio signals.

The at least one processor 120 may obtain sound quality information of the target audio signal. The sound quality information may include information indicative of the accuracy and clarity of the audio signal. The sound quality information may include sound quality data indicative of the sound quality or a sound quality grade indicative of the sound quality. The at least one processor 120 may obtain the sound quality data based on the audio data. The at least one processor 120 may obtain a sound quality grade based on the audio data.

The sound quality grade may include a plurality of grades classified according to a preset scheme. The sound quality grade may represent a relative numerical value of the sound quality of the audio data. The at least one processor 120 may compare the sound quality grade to a threshold grade. The threshold grade may change based on a user setting.

According to an embodiment, the sound quality data may include a Signal-to-Noise Ratio (SNR).

The at least one processor 120 may obtain a target audio signal and a noise signal from the audio data, obtain the Signal-to-Noise Ratio (SNR) based on the target audio signal and the noise signal, and obtain sound quality information based on the Signal-to-Noise Ratio (SNR).

When the Signal-to-Noise Ratio (SNR) is less than a threshold value, the at least one processor 120 may transmit the target audio signal to an external server through the communication interface 130.

The at least one processor 120 may determine the sound quality grade of the first audio signal based on the Signal-to-Noise Ratio (SNR) and a grade table for sound quality stored in a memory, and obtain sound quality information including the sound quality grade.

Figure 10:
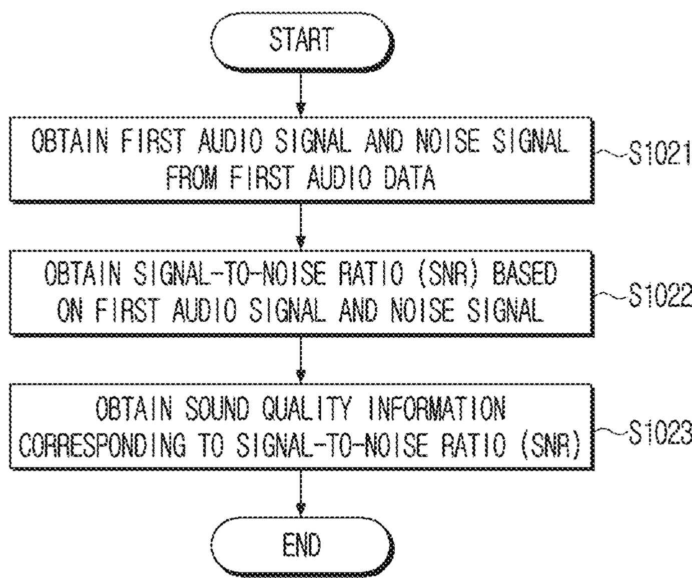
FIG. 10 is a view provided to explain an operation of obtaining sound quality information using a Signal-to-Noise Ratio (SNR) according to an example embodiment.
Figure 11:
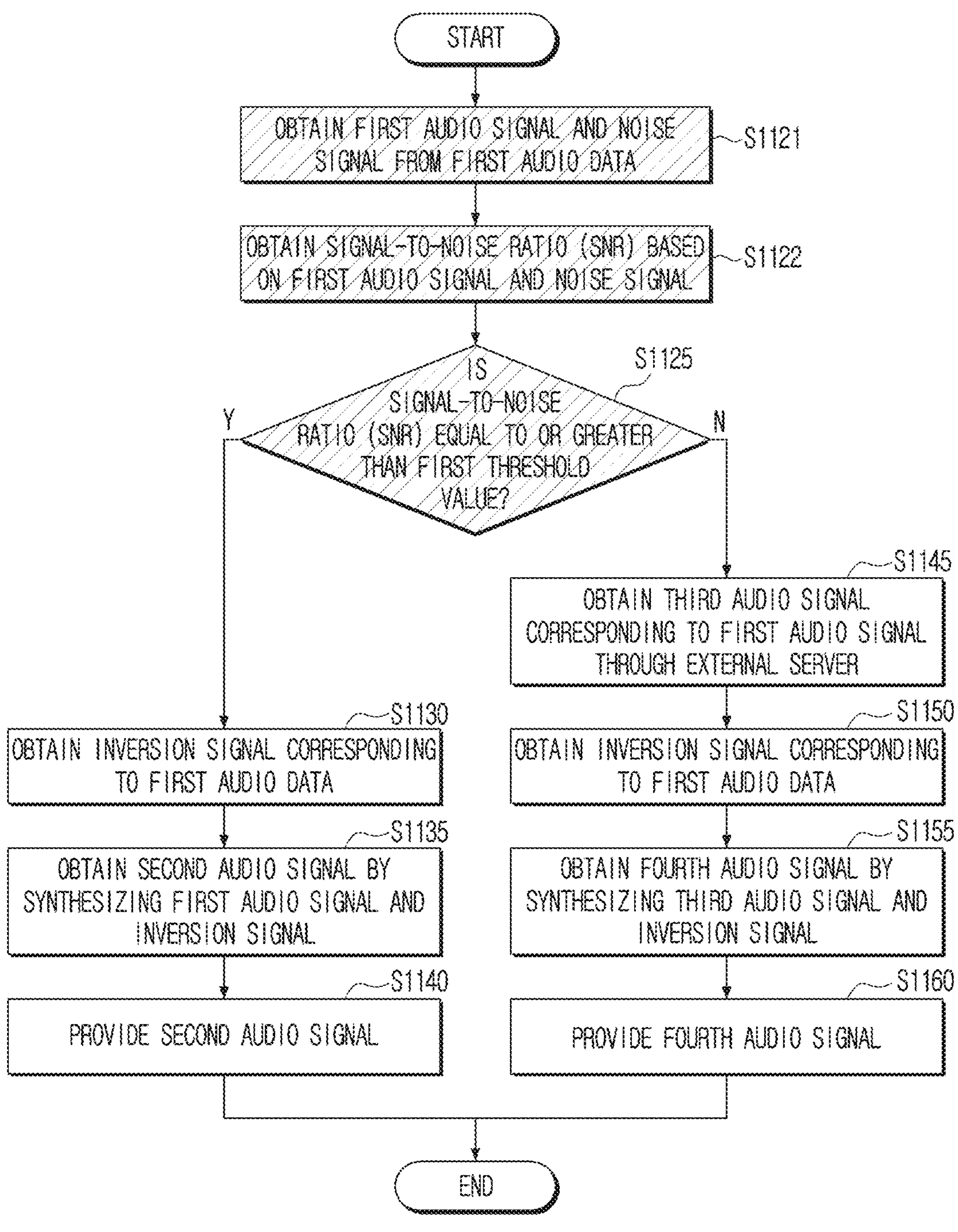
FIG. 11 is a view provided to explain an operation of determining a content providing method using a Signal-to-Noise Ratio (SNR) according to an example embodiment.

Specific descriptions related to the Signal-to-Noise Ratio (SNR) will be provided in FIGS. 9 to 11.

According to an embodiment, the at least one processor 120 may transmit the target audio signal to the external server 300. Since the at least one processor 120 has already extracted the target audio signal that the user wishes to listen to, only the target audio signal may be transmitted to the external server 300 (e.g., see 300 in FIGS. 18-20).

According to an embodiment, the at least one processor 120 may transmit audio data to the external server 300. The at least one processor 120 may transmit audio data including both a target audio signal and a noise signal to the external server 300. The external server 300 may transmit a source audio signal (third audio signal) to the electronic apparatus 100 based on the received audio data.

The at least one processor 120 may transmit the target audio signal (or audio data) to the external server 300 along with a control command (or a control signal) requesting that the external server 300 provide search results. The external server 300 may transmit search results corresponding to the received target audio signal (or audio data) to the electronic apparatus 100 based on the received control command.

The at least one processor 120 may obtain an inversion signal by inverting the phase of a signal included in the audio data to attenuate ambient sound.

The at least one processor 120 may operate in one of a plurality of modes. The plurality of modes may include at least one of an ambient sound collection mode or a noise canceling mode.

The ambient sound collection mode may be a mode for obtaining audio data. The noise canceling mode may be a mode for filtering the target noise sound from the ambient sound. The at least one processor 120 may identify the target noise sound as noise, and may filter the target noise sound identified as noise from the audio data.

The at least one processor 120 may perform the operation of reducing the magnitude of the target noise sound while performing the noise canceling mode. The at least one processor 120 may attenuate (or filter) the target noise sound.

The at least one processor 120 may obtain a target noise signal corresponding to the target noise sound to reduce the magnitude of the target noise sound. The at least one processor 120 may obtain an inversion signal (or an inversion audio signal) having a phase opposite to the phase of the target noise signal.

The at least one processor 120 may perform the noise canceling function by outputting the inversion signal. When the inversion signal is output in a phase opposite to the phase of the target noise signal, the magnitude of the target noise signal may be attenuated.

In performing the noise canceling mode, the at least one processor 120 may set a target noise signal according to a preset scheme.

According to an embodiment, the at least one processor 120 may set all sound (or signals) of the ambient sound to a target noise sound (or target noise signal). When the noise canceling mode is initiated, the at least one processor 120 may attenuate (or filter) all sound included in the ambient sound. The at least one processor 120 may determine that all sound included in the ambient sound is target noise sound.

According to an embodiment, the at least one processor 120 may set only a noise signal among all sound (or signal) in the ambient sound as target noise sound (or target noise signal). The noise signal may include a signal that the user does not want to hear. The noise signal may include noise. The noise signal may represent a signal that does not correspond to voice, music, etc. For example, the noise signal may include machine sound, white noise, etc. In the noise canceling mode, the at least one processor 120 may provide only the audio desired by the user (e.g., the voice of the caller or music) while attenuating the magnitude of ambient environmental noise. An embodiment in this regard will be described with reference to FIG. 16.

The at least one processor 120 may compare the waveform of the target audio signal with the waveform of the source audio signal to determine a playback time of the source audio signal, synthesize (or combine) the inversion signal and an area corresponding to the playback time among the entire area of the source audio signal to obtain a synthesized audio signal, and provide the synthesized audio signal.

The area may be described as a band, a portion, a segment, a clip, etc.

The target audio signal included in the audio data may be an audio signal output based on a particular playback time. The source audio signals may be a signal received as the entire data from the external server 300. The recorded (or collected) audio data may include only a signal corresponding to the particular playback time. The source audio signal received by the external server 300 may include a signal for an initial area or all areas.

The at least one processor 120 may need to determine whether to provide a signal from any point in time of the entire area of the source audio signal. The at least one processor 120 may compare the waveform of the target audio signal with the entire waveform of the source audio signal to determine a playback time same as the waveform of the target audio signal among the entire area of the source audio. The at least one processor 120 may extract (or obtain) an area corresponding to the playback time among the entire area of the source audio signal. The at least one processor 120 may obtain a synthesized audio signal by synthesizing the inversion signal and the area corresponding to the playback time.

For example, it is assumed that the entire content of the target audio signal is music totaling 3 minutes and 30 seconds, and the portion currently being played (the target audio signal) is 1 minute and 10 seconds. The at least one processor 120 may determine 1 minute and 10 seconds as the playback time, and may provide the portion of the source audio signal corresponding to 1 minute and 10 seconds. The playback time will be described with reference to FIG. 14.

The playback time may be described as a playback area, a playback part, an output point, an output area, an output part, etc.

The at least one processor 120 may transmit the synthesized audio signal to the external sound device 200 through the communication interface 130.

The external sound device 200 may be a wireless earphone or a wireless headphone, and the at least one processor 120 may transmit the synthesized audio signal to the external sound device 200 through a Bluetooth communication module included in the communication interface 130. The external sound device 200 will be described with reference to FIGS. 18 to 20.

The synthesized audio signal is a first synthesized audio signal, and when the sound quality information is equal to or greater than a threshold grade, the at least one processor 120 may obtain a second synthesized audio signal (second audio signal) that synthesizes the inversion signal corresponding to the audio data and the target audio signal, and provide the second synthesized audio signal (second audio signal).

When the sound quality information is equal to or greater than the threshold grade, the at least one processor 120 may determine that it is not necessary to obtain the source audio signal from the external server 300. This is because the target audio signal is determined to be of high quality. When the sound quality information of the audio data is equal to or greater than the threshold grade, the at least one processor 120 may provide the target audio signal.

The at least one processor 120 may provide only the target audio signal while simultaneously performing the noise canceling mode. The noise canceling mode may be a function of blocking (or attenuating) at least some of the ambient sound. The at least one processor 120 may provide the extracted target audio signal while performing the noise canceling mode. This will be described in greater detail with reference to FIG. 6.

When the output method of the target audio signal is a mono type, the at least one processor 120 may obtain a conversion signal by converting the target audio signal to a stereo type, and may obtain the second synthesized audio signal (second audio signal) by synthesizing the conversion signal and the inversion signal. The description thereof will be provided with reference to FIG. 15.

The operation of providing an audio signal or audio data may include an output operation or a transmission operation.

According to an embodiment, the at least one processor 120 may output an audio signal through a speaker 170 included in the electronic apparatus 100.

According to an embodiment, the at least one processor 120 may transmit the audio signal to the external server 300.

The operation of recording audio data, the operation of analyzing audio data, and the operation of outputting an audio signal may be separately performed in the electronic apparatus 100 and the sound device 200.

The audio signal providing method of the electronic apparatus 100 according to various embodiments may selectively (or intensively) provide a target audio signal of a preset type to a user.

Figure 3:
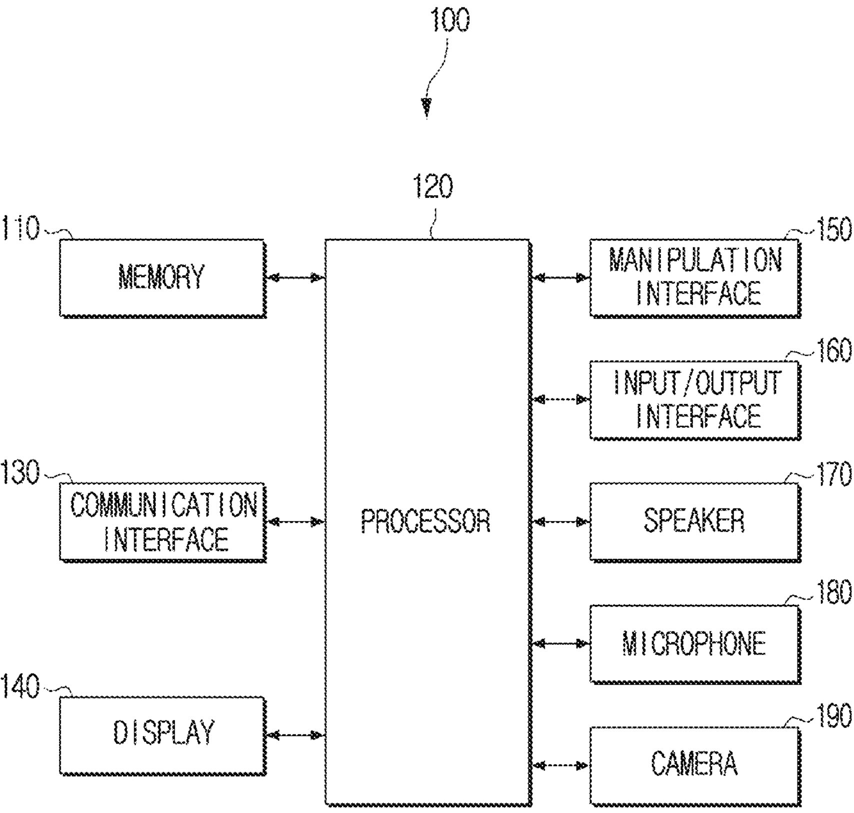
FIG. 3 is a block diagram provided to explain specific configuration of the electronic apparatus of FIG. 2 according to an example embodiment.

FIG. 3 is a block diagram provided to explain specific configuration of the electronic apparatus 100 of FIG. 2 according to an embodiment.

Referring to FIG. 3, the electronic apparatus 100 may include at least one of the memory 110, the at least one processor 120, the communication interface 130, a display 140, a manipulation interface 150, an input/output interface 160, a speaker 170, a microphone 180, and a camera 190.

The memory 110 may be implemented as an internal memory such as ROM (e.g., electrically erasable programmable read-only memory (EEPROM)) and RAM included in the at least one processor 120, or may be implemented as a separate memory. The memory 110 may be implemented as a memory embedded in the electronic apparatus 100 or as a memory detachable from the electronic apparatus 100 depending on the data storage purpose. For example, in the case of data for driving the electronic apparatus 100, the data may be stored in the memory embedded in the electronic apparatus 100, and in the case of data for the expansion function of the electronic apparatus 100, the data may be stored in a memory detachable from the electronic apparatus 100.

The memory embedded in the electronic apparatus 100 may be implemented as at least one of a volatile memory (e.g. a dynamic RAM (DRAM), a static RAM (SRAM), or a synchronous dynamic RAM (SDRAM)) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g. a NAND flash or a NOR flash), a hard drive, or a solid state drive (SSD)), and the memory detachable from the electronic apparatus 100 may be implemented in the form of a memory card (e.g., a compact flash (CF), a secure digital (SD), a micro secure digital (Micro-SD), a mini secure digital (Mini-SD), an extreme digital (xD), or a multi-media card (MMC)), an external memory connectable to a USB port (e.g., a USB memory), or the like.

The memory 110 may store at least one instruction. The at least one processor 120 may perform various operations based on the instruction stored in the memory 110.

The at least one processor 120 may be implemented as a digital signal processor (DSP) for processing digital signals, a microprocessor, or a time controller (TCON), but is not limited thereto, and the at least one processor 120 may include one or more of a central processing unit (CPU), a micro controller unit (MCU), a micro processing unit (MPU), a controller, an application processor (AP), a graphics-processing unit (GPU), a communication processor (CP), and an ARM (advanced reduced instruction set computer (RISC) machines) processor, or may be defined as the corresponding term. The at least one processor 120 may be implemented as a system on chip (SoC) with embedded processing algorithms or a large scale integration (LSI), or in the form of a field programmable gate array (FPGA). The at least one processor 120 may perform various functions by executing computer executable instructions stored in the memory.

The communication interface 130 is configured to perform communication with various types of external devices according to various types of communication methods. The communication interface 130 may include a wireless communication module or a wired communication module. Each communication module may be implemented in the form of at least one hardware chip.

The wireless communication module may be a module that performs communication with an external device wirelessly. For example, the wireless communication module may include at least one of a Wi-Fi module, a Bluetooth module, an infrared communication module, or other communication modules comprising communication circuitry.

The Wi-Fi module and the Bluetooth module may perform communication using a Wi-Fi method and a Bluetooth method, respectively. When using a Wi-Fi module or a Bluetooth module, various connection information such as service set identifier (SSID) and session key are first transmitted and received, and various information can be transmitted and received after establishing communication connection using the same.

The infrared communication module performs communication according to an infrared Data Association (IrDA) communication technology which transmits data wirelessly over a short distance using infrared rays between optical light and millimeter waves.

Other communication modules may include at least one communication chip that performs communication according to various wireless communication standards, such as Zigbee, 3rd Generation (3G), 3rd Generation Partnership Project (3GPP), Long Term Evolution (LTE), LTE advanced (LTE-A), 4th Generation (4G), 5th Generation (5G), etc. other than the above-described communication methods.

The wired communication module may be a module that performs communication with an external device via cable. For example, the wired communication module may include at least one of a local area network (LAN) module, an Ethernet module, a pair cable, a coaxial cable, an optical fiber cable, or an Ultra Wide-Band (UWB) module.

According to various embodiments, the communication interface 130, comprising communication circuitry, may utilize the same communication module (e.g., a Wi-Fi module) to perform communication with an external device such as a remote controller, and an external server.

According to various embodiments, the communication interface 130 may utilize different communication modules, comprising communication circuitry, to perform communication with an external device such as a remote controller, and an external server. For example, the communication interface 130 may utilize at least one of an Ethernet module or a Wi-Fi module to perform communication with an external server, and may utilize a Bluetooth module to perform communication with an external device such as a remote controller. However, this is only one embodiment, and the communication interface 130 may utilize at least one of various communication modules when performing communication with a plurality of external devices or external servers.

The display 140 may be implemented as various types of displays such as liquid crystal displays (LCDs), organic light emitting diodes (OLED) displays, plasma display panels (PDP), and the like. The display 140 may also include drive circuitry, backlight units, and the like, which may be implemented in the form of a-si amorphous silicon thin film transistor (TFT), low temperature poly silicon (LTPS) TFT, organic TFT (OTFT), and the like. The display 140 may be implemented as a touch screen combined with a touch sensor, a flexible display, a three-dimensional (3D) display, and the like. The display 140 according to an embodiment may include a bezel that houses a display panel as well as a display panel that outputs an image. In particular, the bezel according to an embodiment may include a touch sensor for detecting a user interaction.

The manipulation interface 150 may be implemented as a button, a touch pad, a mouse, a keyboard, etc., or may be implemented as a touch screen that can also perform the above-described display function and manipulation input function. The button may be provided in various types such as a mechanical button, a touch pad, a wheel, etc. formed in any arbitrary area such as the front, side, or back.

The input/output interface 160 may be one of High Definition Multimedia Interface (HDMI), Mobile High-Definition Link (MHL), Universal Serial Bus (USB), Display Port (DP), Thunderbolt, and Video Graphics Array (VGA) port, RGB port, D-subminiature (D-SUB), or Digital Visual Interface (DVI). The input/output interface 160 may input/output at least one of audio and video signals. Depending on the implementation, the input/output interface 160 may include a port that inputs and outputs only audio signals and a port that inputs and outputs only video signals as separate ports, or may be implemented as a single port that inputs and outputs both audio signals and video signals. The electronic apparatus 100 may transmit at least one of audio signal or video signal to an external device (e.g., an external display device or an external speaker) through the input/output interface 160. The output port included in the input/output interface 160 may be connected to an external device, and the electronic apparatus 100 may transmit at least one of audio signal or video signal to the external device through the output port.

The input/output interface 160 may be connected, directly or indirectly, to a communication interface. The input/output interface 160 may transmit information received from an external device to the communication interface, or may transmit information received through the communication interface to the external device.

The speaker 170 is configured to output various notification sounds or voice messages as well as various audio data.

The microphone 180 is configured to receive a user voice or other sound and convert it into audio data. The microphone 180 may receive a user voice in an activated state. For example, the microphone 180 may be integrally formed in the direction of the top, front, side, etc. of the electronic apparatus 100. The microphone 180 may include various components such as a microphone that collects a user voice in an analog form, an amplification circuit that amplifies the collected user voice, an A/D conversion circuit that samples the amplified user voice and converts it into a digital signal, a filter circuit that removes noise components from the converted digital signal, etc.

The camera 190 is configured to capture a subject and generate a captured image, and the captured image is a concept that includes both moving images and still images.

The camera 190 may obtain images for at least one external device, and may be implemented as a camera, a lens, an infrared sensor, etc.

The camera 190 may include a lens and an image sensor. Types of lenses include general-purpose lenses, wide-angle lenses, and zoom lenses, and may be determined depending on the type, characteristics, and use environment of the electronic apparatus 100. As the image sensor, complementary metal oxide semiconductor (CMOS), charge coupled device (CCD), etc. may be used.

Figure 4:
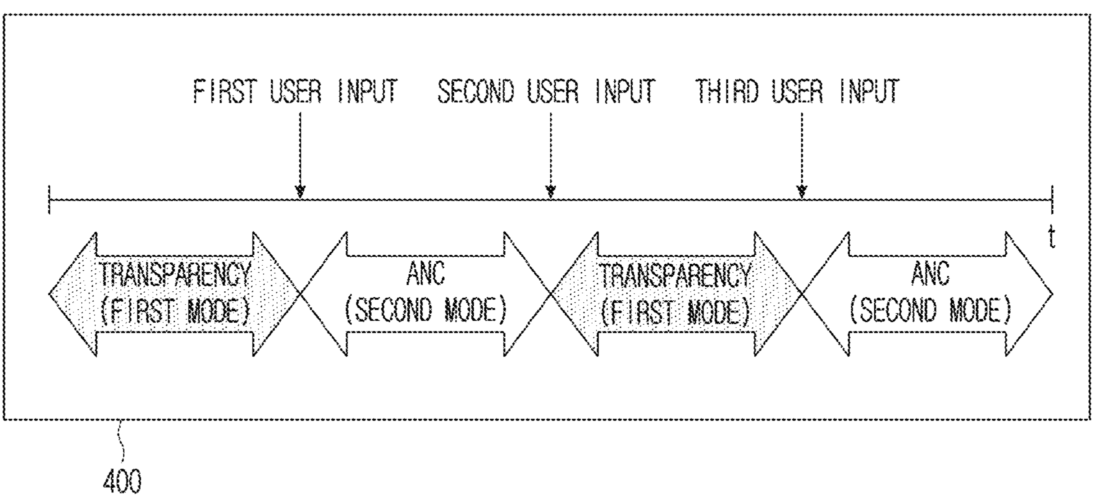
FIG. 4 is a view provided to explain a mode performed in an electronic apparatus according to an example embodiment.

FIG. 4 is a view provided to explain a mode performed in the electronic apparatus 100 according to an embodiment.

Referring to an embodiment 400 of FIG. 4, the electronic apparatus 100 may operate in one of a plurality of modes. The plurality of modes may include at least one of an ambient sound collection mode or a noise canceling mode.

The ambient sound collection mode may be described as a first mode. When operating in the first mode, the electronic apparatus 100 may measure ambient sound using a microphone included in the electronic apparatus 100. The electronic apparatus 100 may obtain digital data about the ambient sound obtained through the microphone.

The noise canceling mode may be described as a second mode. When operating in the second mode, the electronic apparatus 100 may reduce a target noise signal in the ambient sound. The target noise signal may include a canceling target. The operation of reducing the target noise signal may include at least one of: reducing the magnitude of the target noise signal, attenuating the target noise signal, removing the target noise signal, or offsetting the target noise signal.

In one example, the target noise signal may be any signal included in the ambient sound. The target noise signal may include any signal in the ambient sound that is measured by the electronic apparatus 100. The electronic apparatus 100 may set all signals included in the ambient sound as the target signal, and the electronic apparatus 100 may reduce all signals included in the ambient sound.

In one example, the target noise signal may include a noise signal among signals included in the ambient sound. The target noise signal may include only signals associated with noise. The electronic apparatus 100 may set the target noise signal as the noise signal, and the electronic apparatus 100 may reduce only signals corresponding to noise in the ambient sound.

The electronic apparatus 100 may operate in either a first mode or a second mode in response to a user command. When a first user input to change to the second mode is received while operating in the first mode, the electronic apparatus 100 may change the mode from the first mode to the second mode.

When a second user input to change to the first mode is received while operating in the second mode, the electronic apparatus 100 may change the mode from the second mode to the first mode.

When a third user input to change to the first mode is received while operating in the second mode, the electronic apparatus 100 may change the mode from the first mode to the second mode.

The electronic apparatus 100 may change the mode based on a user input or a preset control command.

Figure 5:
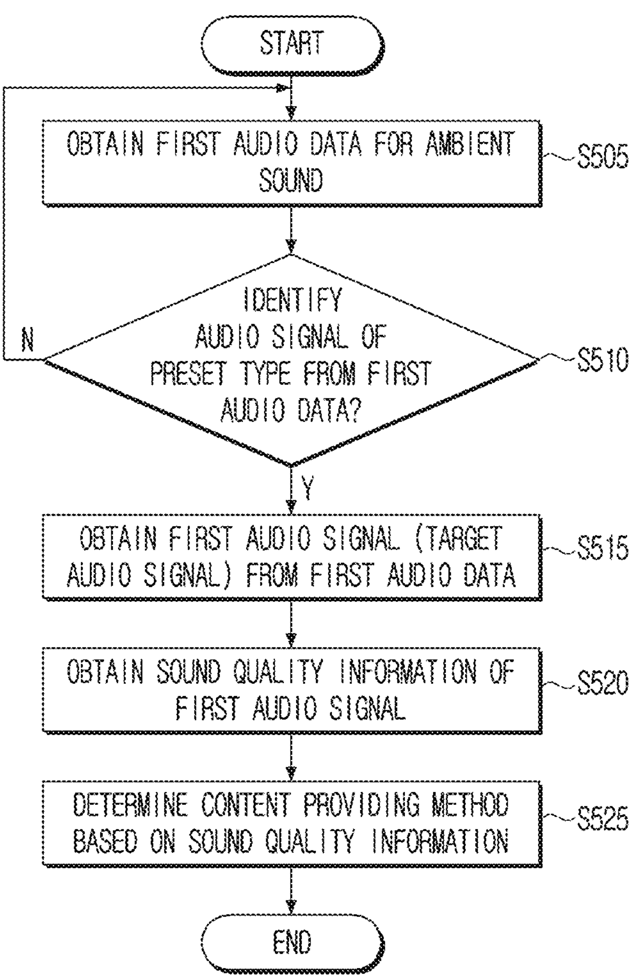
FIG. 5 is a view provided to explain an operation of obtaining an audio signal according to an example embodiment.

FIG. 5 is a view provided to explain an operation of obtaining an audio signal according to an embodiment.

Referring to FIG. 5, the electronic apparatus 100 may obtain first audio data about ambient sound (S505). The audio data may include signals measuring the ambient sound. The ambient sound may include at least one audio signal measured in a space where the electronic apparatus 100 is located. The ambient sound may represent at least one of analog audio data or digital audio data.

The electronic apparatus 100 may determine whether an audio signal of a preset type is identified in the first audio data. The electronic apparatus 100 may determine whether an audio signal of a preset type is identified among a plurality of audio signals included in the first audio data (S510). The preset type may be a type representing musical content. For example, the preset type may include a music type.

When the audio signal of the preset type is not identified in the first audio data (S510-N), the electronic apparatus 100 may perform steps S505 and S510.

When the audio signal of the preset type is identified in the first audio data (S510-Y), the electronic apparatus 100 may obtain a first audio signal from the first audio data (S515). The first audio signal may represent an audio signal corresponding to the preset type. The electronic apparatus 100 may obtain (or extract) the first audio signal corresponding to the preset type from at least one audio signal included in the first audio data.

The electronic apparatus 100 may obtain sound quality information of the first audio signal (S520). The sound quality information may include information indicative of the accuracy and clarity of the audio signal.

The electronic apparatus 100 may include various methods for obtaining sound quality information of the first audio signal.

According to an embodiment, the electronic apparatus 100 may obtain sound quality information using a Signal-to-Noise Ratio (SNR). The electronic apparatus 100 may distinguish (extract or separate) the first audio signal and the noise signal in the first audio data. The electronic apparatus 100 may obtain the energy of the first audio signal and the energy of the noise signal. The electronic apparatus 100 may obtain a Signal-to-Noise Ratio (SNR) using 10*log (energy of the first audio signal/energy of the noise signal). The electronic apparatus 100 may obtain sound quality information (or a value indicative of sound quality) corresponding to the first audio signal using the Signal-to-Noise Ratio. The electronic apparatus 100 may determine that the greater the Signal-to-Noise Ratio (SNR), the higher (better) the sound quality. Specific descriptions in this regard will be provided with reference to FIGS. 10 and 11.

According to an embodiment, the electronic apparatus 100 may obtain sound quality information using a recognition rate. The recognition rate may represent at least one of a probability that a result of the audio signal is recognized or an accuracy associated with a result of the audio signal. The electronic apparatus 100 may obtain a recognition rate for the first audio signal. The electronic apparatus 100 may determine that the greater the recognition rate, the higher the sound quality. The recognition rate may be described as a recognition probability, a recognition ratio, a recognition accuracy, or the like. Specific descriptions in this regard will be provided with reference to FIGS. 12 and 13.

According to an embodiment, the electronic apparatus 100 may obtain sound quality information using a dynamic range. The dynamic range may represent the difference between the lowest and highest volume. The electronic apparatus 100 may determine that the greater the dynamic range, the higher the sound quality.

According to an embodiment, the electronic apparatus 100 may obtain sound quality information using a frequency response. The frequency response may include a frequency bandwidth. The electronic apparatus 100 may determine that the wider (greater) the frequency bandwidth, the higher the sound quality.

According to an embodiment, the electronic apparatus 100 may obtain sound quality information using a bit depth or a sampling rate. The electronic apparatus 100 may determine that the higher the bit depth or the sampling rate, the higher the sound quality.

According to an embodiment, the electronic apparatus 100 may obtain sound quality information using a bitrate. The electronic apparatus 100 may determine that the higher the bitrate, the higher the sound quality.

The electronic apparatus 100 may determine a content providing method based on the sound quality information (S525). The content may include content associated with the first audio signal of the preset type. The content may represent content obtained using the first audio signal.

Figure 6:
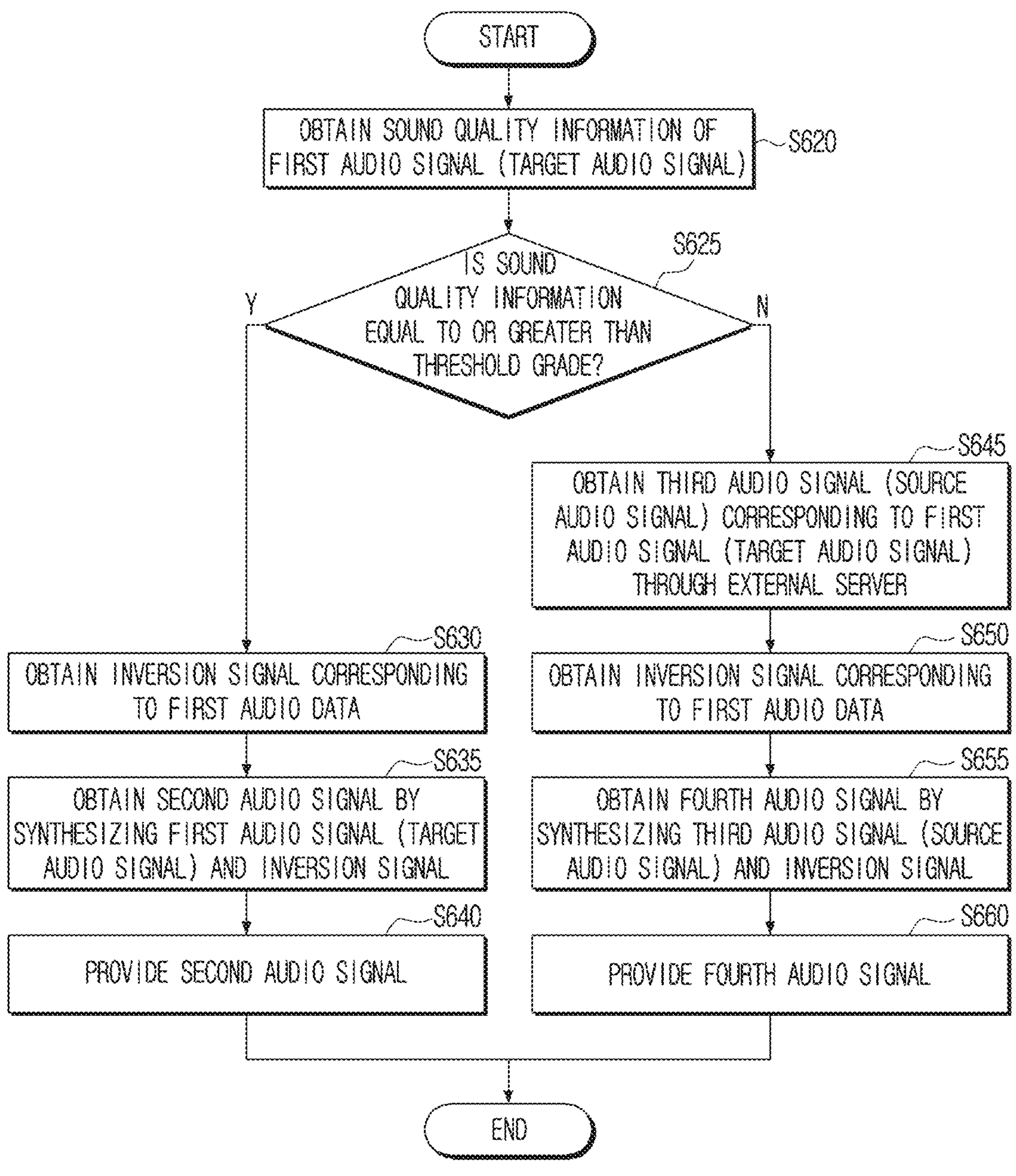
FIG. 6 is a view provided to explain a content providing method using sound quality information according to an example embodiment.

FIG. 6 is a view provided to explain a content providing method using sound quality information according to an embodiment.

Referring to FIG. 6, the electronic apparatus 100 may obtain sound quality information of the first audio signal (S620). Step S620 may correspond to step S520 of FIG. 5.

The electronic apparatus 100 may determine whether the sound quality information is equal to or greater than a threshold grade (S625). The electronic apparatus 100 may determine a grade for the sound quality of the first audio signal. The sound quality information may include a sound quality grade. The electronic apparatus 100 may obtain a sound quality grade for the sound quality of the first audio signal. The electronic apparatus 100 may compare the sound quality grade with the threshold grade.

When the sound quality information is equal to or greater than the threshold grade, the electronic apparatus 100 may determine that the first audio signal is of high quality. The electronic apparatus 100 may provide a high-quality first audio signal. When the sound quality information is less than the threshold grade, the electronic apparatus 100 may determine that the first audio signal is of low quality. The electronic apparatus 100 may not provide the low-quality first audio signal, but may provide a third audio signal received through an external server.

The sound quality grade may be determined based on a grade table for sound quality, which will be described with reference to FIG. 9.

When the sound quality information is equal to or greater than the threshold grade (YES in S625), the electronic apparatus 100 may obtain an inversion signal corresponding to the first audio data (S630). The inversion signal may represent a signal for offsetting a plurality of signals included in the first audio data. The inversion signal may be described as an opposite signal, an offset signal, an attenuation signal, an inversion waveform, an opposite waveform, an offset waveform, an attenuation waveform, or the like.

The electronic apparatus 100 may obtain the second audio signal by synthesizing (or combining) the first audio signal and the inversion signal (S635). The electronic apparatus 100 may provide the second audio signal (S640).

The operation of providing the second audio signal may indicate performing a noise canceling operation. In the embodiment of FIG. 6, the target noise signal of the noise canceling function may be the entire ambient sound. In the embodiment of FIG. 6, all signals may be canceled (or filtered) without distinguishing between the first audio signal of the preset type, the noise signal, and the like. The electronic apparatus 100 may provide the first audio signal equal to or greater than the threshold grade by combining the already extracted first audio signal while canceling all ambient sound. The electronic apparatus 100 may obtain the second audio signal by synthesizing the first audio signal and the inversion signal to filter out all ambient sound and provide only the extracted first audio signal.

When the sound quality information is not equal to or greater than the threshold grade (S625-N), the electronic apparatus 100 may obtain the third audio signal corresponding to the first audio signal through an external server (S645). The external server may be a server that provides source data for the first audio signal. For example, the external server may include an over-the-top (OTT) related server or a content providing server that provides content.

The electronic apparatus 100 may transmit information including the first audio signal to an external server. The external server may identify the third audio signal corresponding to the first audio signal by searching the first audio signal. The external server may transmit the third audio signal to the electronic apparatus 100. The third audio signal may be included in the original source data. For example, the third audio signal may represent a high-quality audio signal provided by a content providing server.

The electronic apparatus 100 may obtain an inversion signal corresponding to the first audio data (S650). Step S650 may correspond to step S630.

The electronic apparatus 100 may obtain the fourth audio signal by synthesizing the third audio signal and the inversion signal (S655). The electronic apparatus 100 may provide the fourth audio signal (S660).

The operation of providing the fourth audio signal may indicate performing a noise canceling operation. The electronic apparatus 100 may cancel all ambient sound, but receive a high-quality third audio signal from an external server instead of the first audio signal determined of low quality and provide the same.

The operation of providing the second audio signal may include an operation in which the electronic apparatus 100 directly extracts the first audio signal from the first audio data, and provides the first audio signal with ambient sound removed.

The operation of providing the fourth audio signal may include an operation in which the electronic apparatus 100 obtains the third audio signal received from the external server other than the first audio data, and provides the third audio signal (high-quality signal) with ambient sound removed.

According to various embodiments, the electronic apparatus 100 may obtain the third audio signal corresponding to the first audio signal using database included in the electronic apparatus 100 without using an external server.

Figure 7:
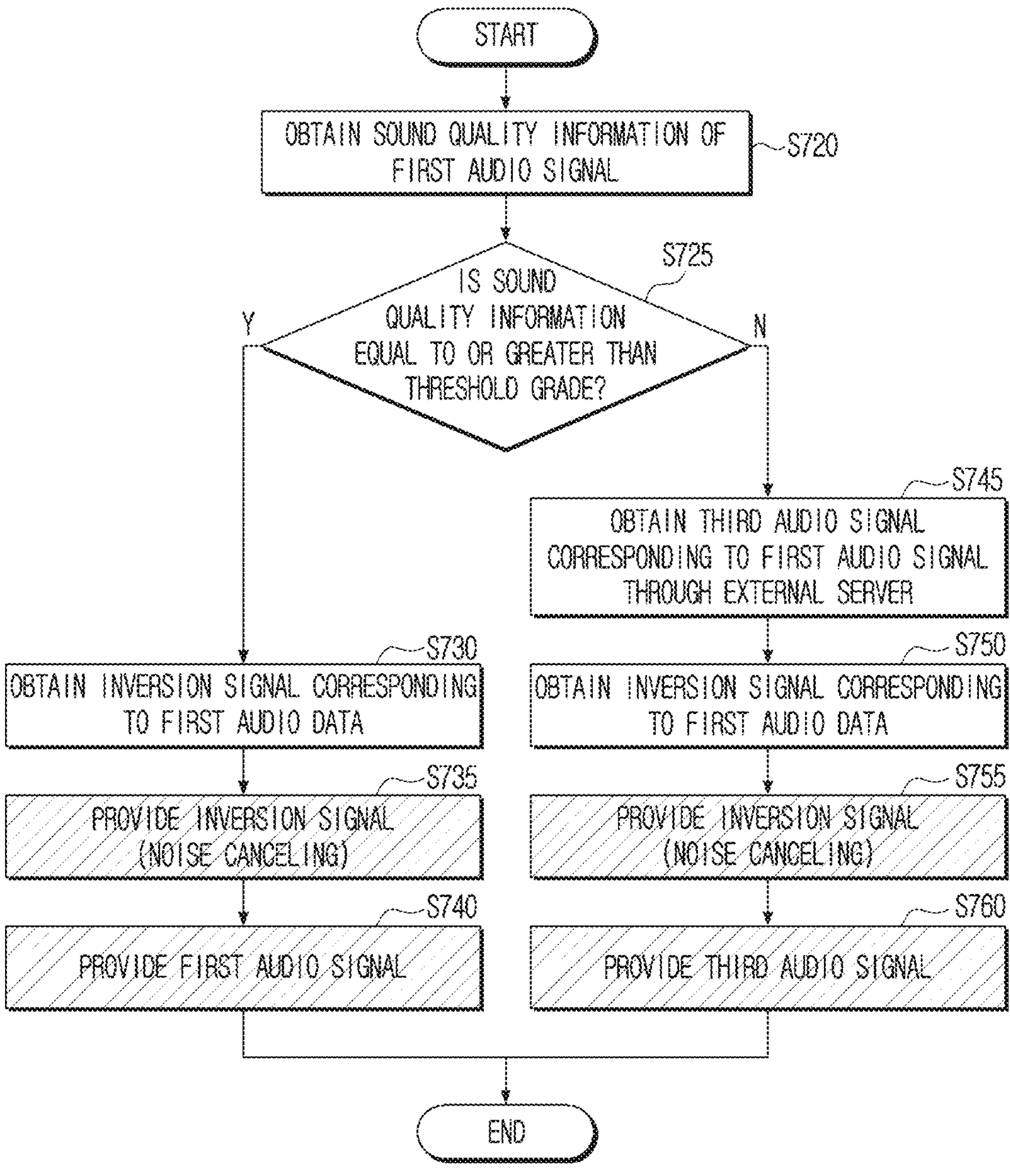
FIG. 7 is a view provided to explain an operation of determining different content providing methods using sound quality information according to an example embodiment.

FIG. 7 is a view provided to explain an operation of determining different content providing methods using sound quality information according to an embodiment.

Steps S720, S725, S730, S745, and S750 of FIG. 7 may correspond to steps S620, S625, S630, S645, and S650 of FIG. 6. Redundant descriptions will be omitted for purposes of simplicity.

When the sound quality information is equal to or greater than a threshold grade (S725-Y), the electronic apparatus 100 may obtain an inversion signal corresponding to the first audio data (S730). The electronic apparatus 100 may provide the inversion signal (S735). The electronic apparatus 100 may perform a noise canceling function by providing the inversion signal. The electronic apparatus 100 may provide the first audio signal (S740).

The electronic apparatus 100 may perform the operation of providing the inversion signal and the operation of providing the first audio signal. Providing the inversion signal attenuates the ambient sound included in the first audio data, so the electronic apparatus 100 may provide a high-quality first audio signal while performing a noise canceling function.

When the sound quality information is not equal to or greater than the threshold grade (S725-N), the electronic apparatus 100 may obtain the third audio signal (S745). The electronic apparatus 100 may obtain an inversion signal corresponding to the first audio data (S750). The electronic apparatus 100 may provide the inversion signal (S755). The electronic apparatus 100 may perform a noise canceling function by providing the inversion signal. The electronic apparatus 100 may provide the third audio signal (S760).

The electronic apparatus 100 may perform the operation of providing the inversion signal and the operation of providing the third audio signal. Providing the inversion signal attenuates the ambient sound included in the first audio data, so the electronic apparatus 100 may provide a high-quality third audio signal while performing a noise canceling function.

Figure 8:
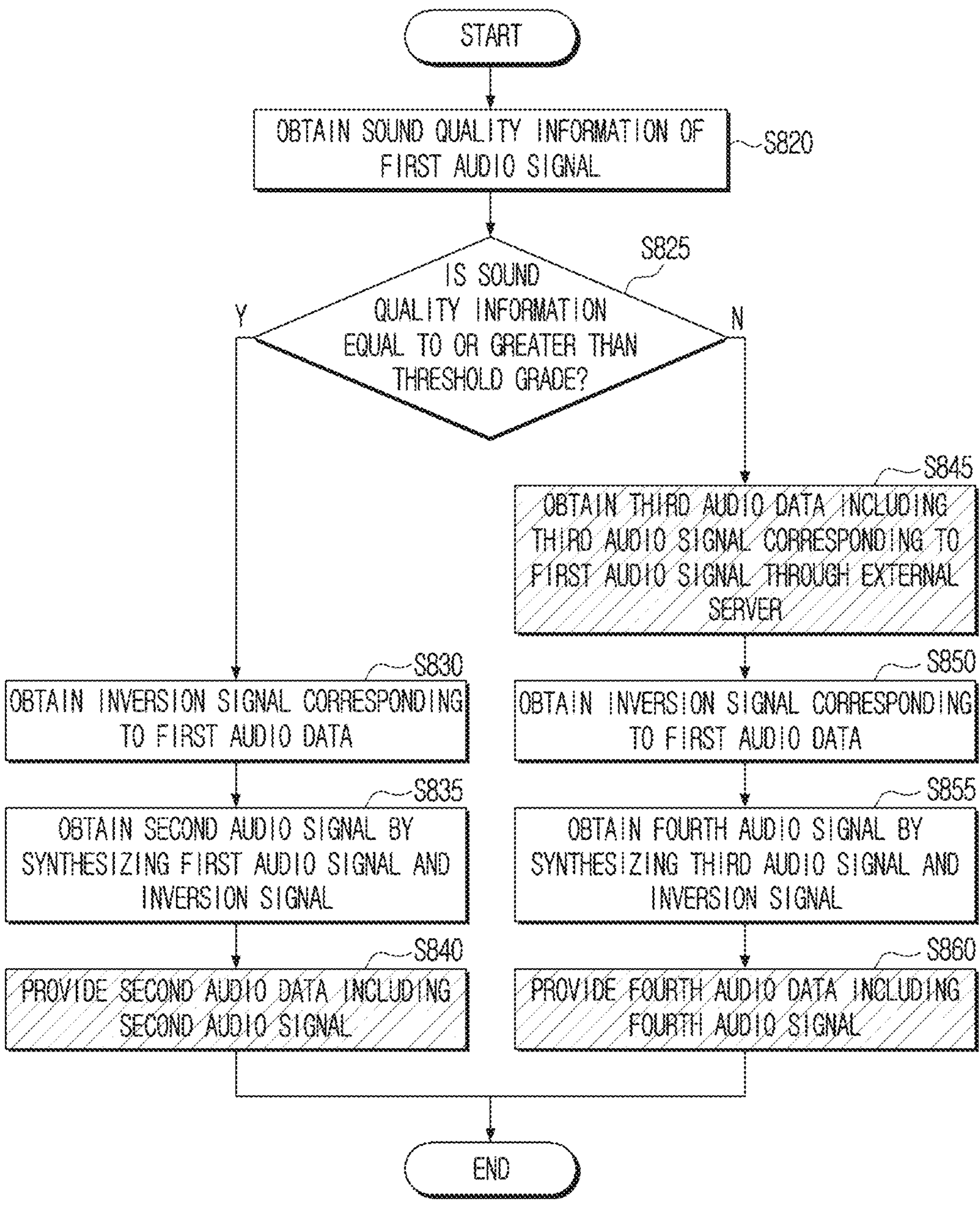
FIG. 8 is a view provided to explain audio data according to an example embodiment.

FIG. 8 is a view provided to explain audio data according to an embodiment.

Steps S820, S825, S830, S835, S840, S845, S850, S855, and S860 of FIG. 8 may correspond to steps S620, S625, S630, S635, S640, S645, S650, S655, and S660 of FIG. 6. Redundant descriptions will be omitted for purposes of simplicity.

After obtaining the second audio signal, the electronic apparatus 100 may provide second audio data including the second audio signal (S840).

When the sound quality information is not equal to or greater than the threshold grade (S825-N), the electronic apparatus 100 may obtain third audio data including the third audio signal corresponding to the first audio signal through an external server (S845).

After obtaining the fourth audio signal, the electronic apparatus 100 may provide fourth audio data including the fourth audio signal (S860).

The audio signal may represent an audio waveform. The audio data may include an audio signal and metadata associated with the audio signal. The metadata may include at least one of title, singer, lyricist, composer, lyrics, duration, category, album name, or album release date associated with the audio signal. The audio data may further include various information for describing audio as well as an audio signal that simply represents an audio waveform.

FIG. 9 is a view provided to explain grade criteria of sound quality information according to an embodiment.

Referring to FIG. 9, the electronic apparatus 100 may display a grade table 900 for sound quality indicative of sound quality grade criteria. The sound quality grades may be categorized as first, second, and third grades. A higher grade may indicate a relatively higher quality of the audio signal.

In one example, when the Signal-to-Noise Ratio (SNR) is 10 dB or less, the electronic apparatus 100 may determine that the sound quality information of the first audio signal is grade 3. When the Signal-to-Noise Ratio (SNR) is greater than 10 dB and less than or equal to 20 dB, the electronic apparatus 100 may determine that the sound quality information of the first audio signal is grade 2. When the Signal-to-Noise Ratio (SNR) is greater than 20 dB, the electronic apparatus 100 may determine that the sound quality information of the first audio signal is grade 1.

In one example, when the recognition rate is 70% or less, the electronic apparatus 100 may determine that the sound quality information of the first audio signal is grade 3. When the recognition rate is greater than 70% and less than or equal to 90%, the electronic apparatus 100 may determine that the sound quality information of the first audio signal is grade 2. When the recognition rate is greater than 90%, the electronic apparatus 100 may determine that the sound quality information of the first audio signal is grade 1.

The number of grades and the criteria (such as a threshold value, etc.) for dividing the grades are merely one embodiment, and may be changed based on a user setting.

FIG. 10 is a view provided to explain an operation of obtaining sound quality information using a Signal-to-Noise Ratio (SNR) according to an embodiment.

Referring to FIG. 10, the electronic apparatus 100 may obtain the first audio signal and the noise signal from the first audio data (S1021). The electronic apparatus 100 may extract the first audio signal and the noise signal from the first audio data, respectively.

The electronic apparatus 100 may obtain a Signal-to-Noise Ratio (SNR) based on the first audio signal and the noise signal (S1022). The electronic apparatus 100 may obtain the energy of the first audio signal and the energy of the noise signal. The electronic apparatus 100 may obtain a Signal-to-Noise Ratio (SNR) using 10*log (energy of the first audio signal/energy of the noise signal). The electronic apparatus 100 may obtain sound quality information (or a value indicative of sound quality) corresponding to the first audio signal using the Signal-to-Noise Ratio. The electronic apparatus 100 may determine that the greater the Signal-to-Noise Ratio (SNR), the higher (better) the sound quality.

The electronic apparatus 100 may obtain sound quality information corresponding to the Signal-to-Noise Ratio (SNR) (S1023). The electronic apparatus 100 may obtain (or determine) a sound quality grade of the first audio signal based on the Signal-to-Noise Ratio (SNR) and the grade table 900 of FIG. 9 for sound quality. The sound quality information may include a sound quality grade associated with the sound quality of the first audio signal. The electronic apparatus 100 may obtain the sound quality information based on the Signal-to-Noise Ratio (SNR).

FIG. 11 is a view provided to explain an operation of determining a content providing method using a Signal-to-Noise Ratio (SNR) according to an embodiment.

Steps S1121 and S1122 of FIG. 11 may correspond to steps S1021 and S1022 of FIG. 10. Steps S1130, S1135, S1140, S1145, S1150, S1155, and S1160 of FIG. 11 may correspond to steps S630, S635, S640, S645, S650, S655, and S660 of FIG. 6. Redundant descriptions will be omitted for purposes of simplicity.

The electronic apparatus 100 may obtain the first audio signal and the noise signal from the first audio data (S1121). The electronic apparatus 100 may obtain a Signal-to-Noise Ratio (SNR) based on the first audio signal and the noise signal (S1122).

The electronic apparatus 100 may determine whether the Signal-to-Noise Ratio (SNR) is equal to or greater than a first threshold value (S1125). When the Signal-to-Noise Ratio (SNR) is equal to or greater than the first threshold value (S1125-Y), the electronic apparatus 100 may determine that the first audio signal is of relatively high quality. When the Signal-to-Noise Ratio (SNR) is not equal to or greater than the first threshold value (S1125-N), the electronic apparatus 100 may determine that the first audio signal is of relatively low quality.

When the Signal-to-Noise Ratio (SNR) is equal to or greater than the first threshold value (S1125-Y), the electronic apparatus 100 may perform steps S1130, S1135, and S1140.

When the Signal-to-Noise Ratio (SNR) is not equal to or greater than the first threshold value (S1125-N), the electronic apparatus 100 may perform steps S1145, S1150, S1155, and S1160 as shown in FIG. 11.

Figure 12:
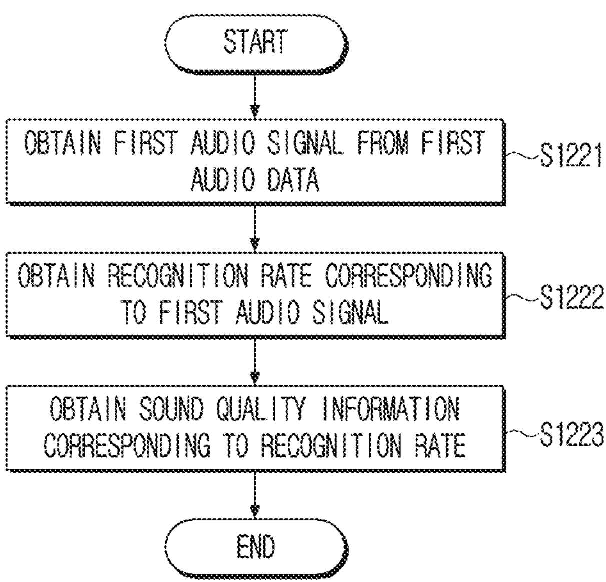
FIG. 12 is a view provided to explain an operation of obtaining sound quality information using a recognition rate according an example embodiment.

FIG. 12 is a view provided to explain an operation of obtaining sound quality information using a recognition rate according an embodiment.

Referring to FIG. 12, the electronic apparatus 100 may obtain the first audio signal from the first audio data (S1221). The electronic apparatus 100 may extract (or separate) the first audio signal from the first audio data.

The electronic apparatus 100 may obtain a recognition rate corresponding to the first audio signal (S1222). The recognition rate may represent at least one of a probability that a result of the audio signal is recognized or an accuracy associated with a result of the audio signal. The electronic apparatus 100 may obtain a recognition rate for the first audio signal. The electronic apparatus 100 may determine that the greater the recognition rate, the higher the sound quality. The recognition rate may be described as a recognition probability, a recognition ratio, a recognition accuracy, or the like.

The electronic apparatus 100 may use an artificial intelligence model that receives an audio signal as input data and provides an analysis result and the accuracy of the analysis result.

In one example, the artificial intelligence model may be stored in the electronic apparatus 100. The electronic apparatus 100 may input the first audio signal into the artificial intelligence model to obtain an analysis result corresponding to the first audio signal and the accuracy of the analysis result. The electronic apparatus 100 may obtain a recognition rate based on the accuracy of the analysis result. The electronic apparatus 100 may determine that the higher the analysis result accuracy, the higher the recognition rate.

In one example, the artificial intelligence model may be stored in a server connected to the electronic apparatus 100. The electronic apparatus 100 may transmit the first audio signal to the server. The server may input the first audio signal into the artificial intelligence model to obtain an analysis result corresponding to the first audio signal and the accuracy of the analysis result. The server may transmit the analysis result accuracy to the electronic apparatus 100. The electronic apparatus 100 may obtain a recognition rate based on the analysis result accuracy.

The electronic apparatus 100 may obtain sound quality information corresponding to the recognition rate (S1223). The electronic apparatus 100 may obtain (or determine) a sound quality grade of the first audio signal based on the recognition rate and the grade table 900 of FIG. 9 for sound quality. The sound quality information may include a sound quality grade associated with the sound quality of the first audio signal. The electronic apparatus 100 may obtain the sound quality information based on the recognition rate.

Figure 13:
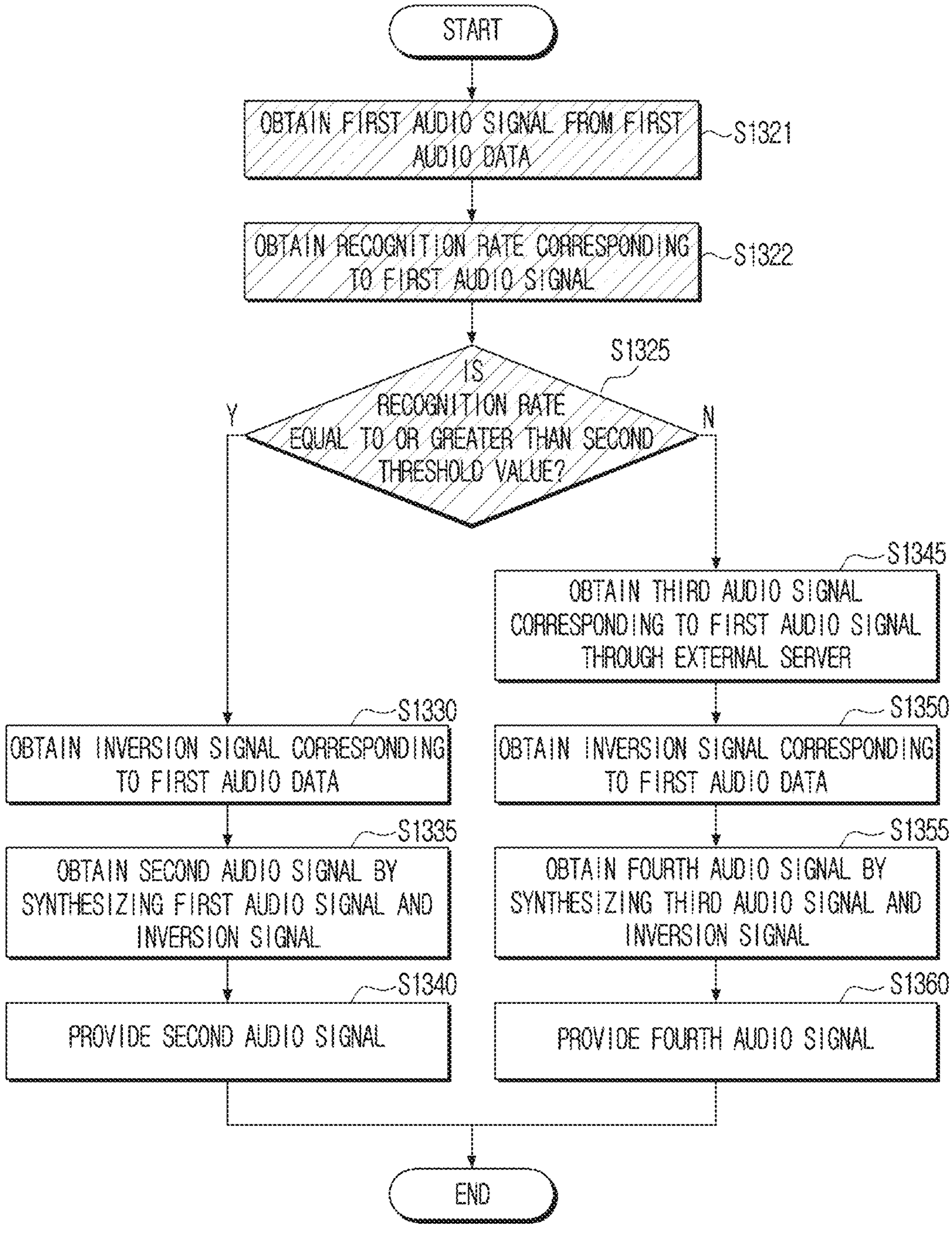
FIG. 13 is a view provided to explain an operation of determining a content providing method using a recognition rate according to an example embodiment.

FIG. 13 is a view provided to explain an operation of determining a content providing method using a recognition rate according to an embodiment.

Steps S1321 and S1322 of FIG. 13 may correspond to steps S1221 and S1222 of FIG. 12. Steps S1330, S1335, S1340, S1345, S1350, S1355, and S1360 of FIG. 13 may correspond to steps S630, S635, S640, S645, S650, S655, and S660 of FIG. 6. Redundant descriptions will be omitted.

The electronic apparatus 100 may obtain the first audio signal from the first audio data (S1321). The electronic apparatus 100 may obtain a recognition rate corresponding to the first audio signal (S1322).

The electronic apparatus 100 may determine whether the recognition rate is equal to or greater than a second threshold value (S1325). When the recognition rate is equal to or greater than the second threshold value (S1325-Y), this may indicate that the first audio signal is of relatively high quality. When the recognition rate is not equal to or greater than the second threshold value (S1325-N), this may indicate that the first audio signal is of relatively low quality.

When the recognition rate is equal to or greater than the second threshold value (S1325-Y), the electronic apparatus 100 may perform steps S1330, S1335, and S1340 as shown in FIG. 13.

When the recognition rate is not equal to or greater than the second threshold value (S1325-N), the electronic apparatus 100 may perform steps S1345, S1350, S1355, and S1360 as shown in FIG. 13.

Figure 14:
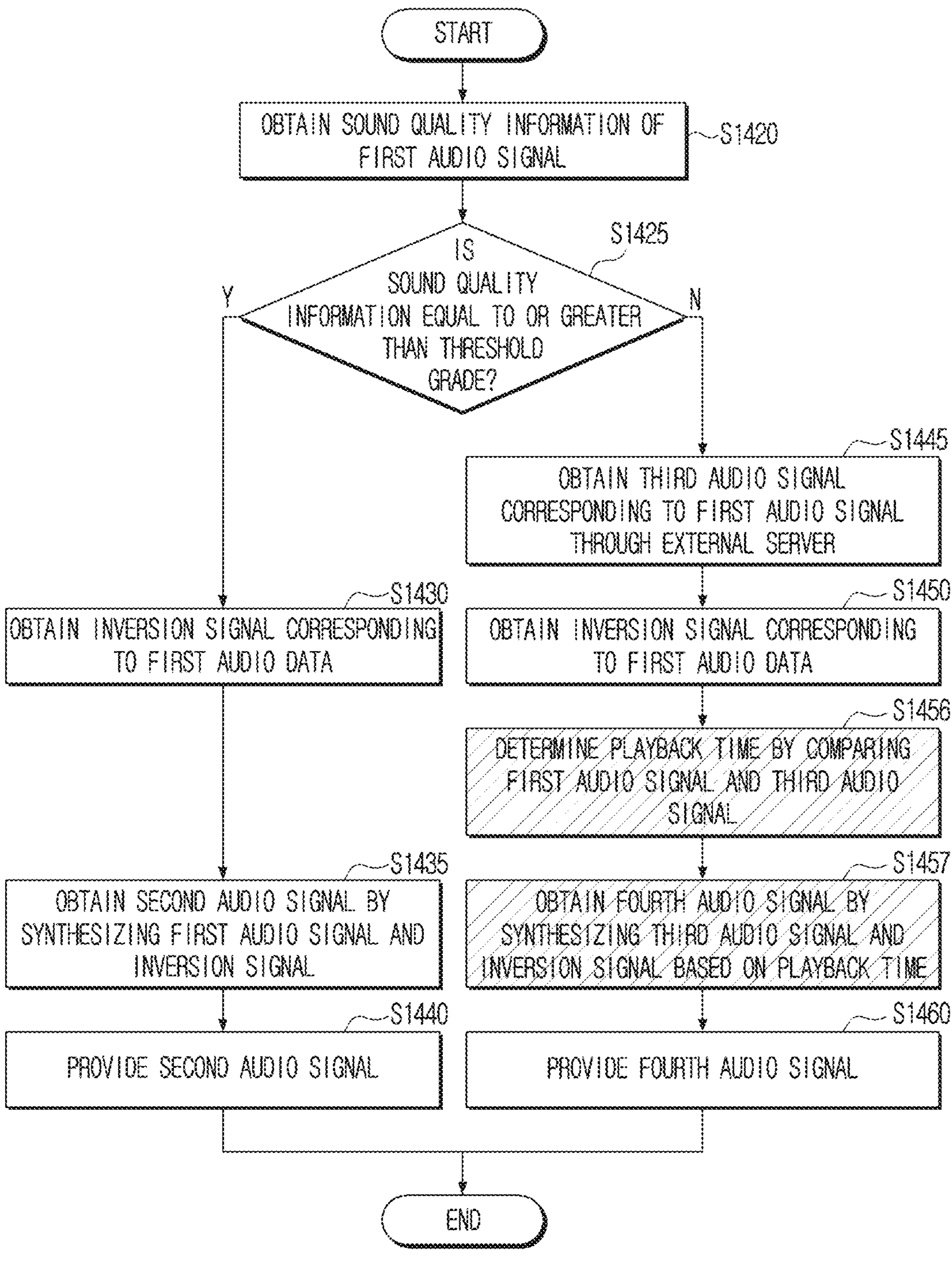
FIG. 14 is a view provided to explain an operation of determining a playback time of a third audio signal according to an example embodiment.

FIG. 14 is a view provided to explain an operation of determining a playback time of a third audio signal according to an embodiment.

Steps S1420, S1425, S1430, S1435, S1440, S1445, S1450, and S1460 of FIG. 14 may correspond to steps S620, S625, S630, S635, S640, S645, S650, and S660 of FIG. 6. Redundant descriptions will be omitted.

The electronic apparatus 100 may obtain the third audio signal corresponding to the first audio signal through an external server (S1445). The electronic apparatus 100 may obtain an inversion signal corresponding to the first audio data (S1450).

The electronic apparatus 100 may compare the first audio signal and the third audio signal to determine a playback time (S1456). The first audio signal may include sound output from the surrounding environment of the electronic apparatus 100 in a space in which the electronic apparatus 100 is disposed. The third audio signal may be audio data obtained through an external server.

There is a need to determine which portion of the entire audio signal is currently being output from ambient sound. This is because even when a noise filtering function is performed, subtle ambient sound may be heard by the user. The third audio signal should be output at the same playback time as the first audio signal as much as possible to minimize or reduce user inconvenience.

Accordingly, it is necessary for the electronic apparatus 100 to analyze the first audio signal to identify the same playback time as the first audio signal that is currently being played, and to output the third audio signal based on the playback time.

For example, it is assumed that the content representing the first audio signal is music totaling 3 minutes and 30 seconds, and that the portion currently being played is 1 minute and 10 seconds. The electronic apparatus 100 may determine 1 minute and 10 seconds as the playback time, and may provide the portion of the third audio signal corresponding to 1 minute and 10 seconds.

The electronic apparatus 100 may obtain the fourth audio signal by synthesizing the third audio signal and the inversion signal based on the playback time (S1457). The electronic apparatus 100 may provide the fourth audio signal.

Figure 15:
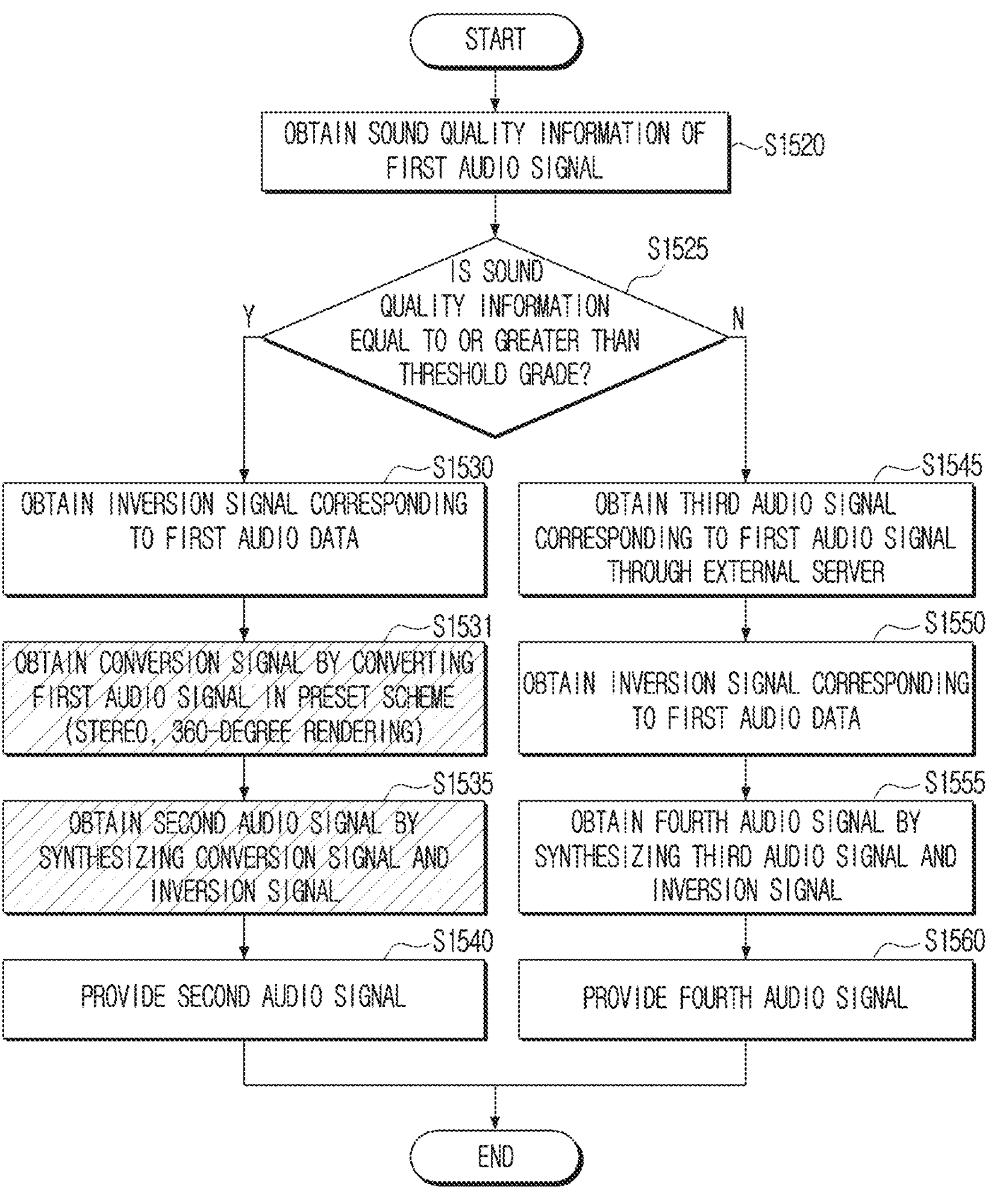
FIG. 15 is a view provided to explain an operation of converting a first audio signal according to an example embodiment.

FIG. 15 is a view provided to explain an operation of converting a first audio signal according to an embodiment.

Steps S1520, S1525, S1530, S1540, S1545, S1550, S1555, and S1560 of FIG. 15 may correspond to steps S620, S625, S630, S640, S645, S650, S655, and S660 of FIG. 6. Redundant descriptions will be omitted.

When the sound quality information is equal to or greater than a threshold grade (S1525-Y), the electronic apparatus 100 may obtain an inversion signal corresponding to the first audio data (S1530). The electronic apparatus 100 may obtain a conversion signal by converting the first audio signal in a preset method (S1531).

The preset method may include at least one of converting a mono audio signal to a stereo audio signal or performing a 360-degree rendering.

In one example, the electronic apparatus 100 may obtain a conversion signal that converts the first audio signal by changing an audio output format (mono, stereo).

The electronic apparatus 100 may identify the output format of the first audio signal. The output format may include at least one of a mono type or a stereo type. The mono type may include a single audio channel. The stereo type may include two audio channels. The stereo type may refer to a left (L) channel and a right (R) channel.

When the output format of the first audio signal is the mono type, the electronic apparatus 100 may convert the output format of the first audio signal to the stereo type. The electronic apparatus 100 may obtain a conversion signal as a result of the conversion operation.

In one example, the electronic apparatus 100 may obtain a conversion signal by performing a 360-degree rendering of the first audio signal.

The 360-degree rendering may include rendering for playback in spatially diverse directions. The 360-degree rendering may include audio rendering provided in a VR or AR environment. The 360-degree rendering may include at least one of: separating (or identifying) an audio object, determining a spatial location of the audio object, performing 3D audio rendering, determining the user's location, or dynamically adjusting the audio based on the user's location.

The electronic apparatus 100 may obtain the second audio signal by synthesizing the conversion signal and the inversion signal (S1535). The electronic apparatus 100 may provide the second audio signal (S1540).

Figure 16:
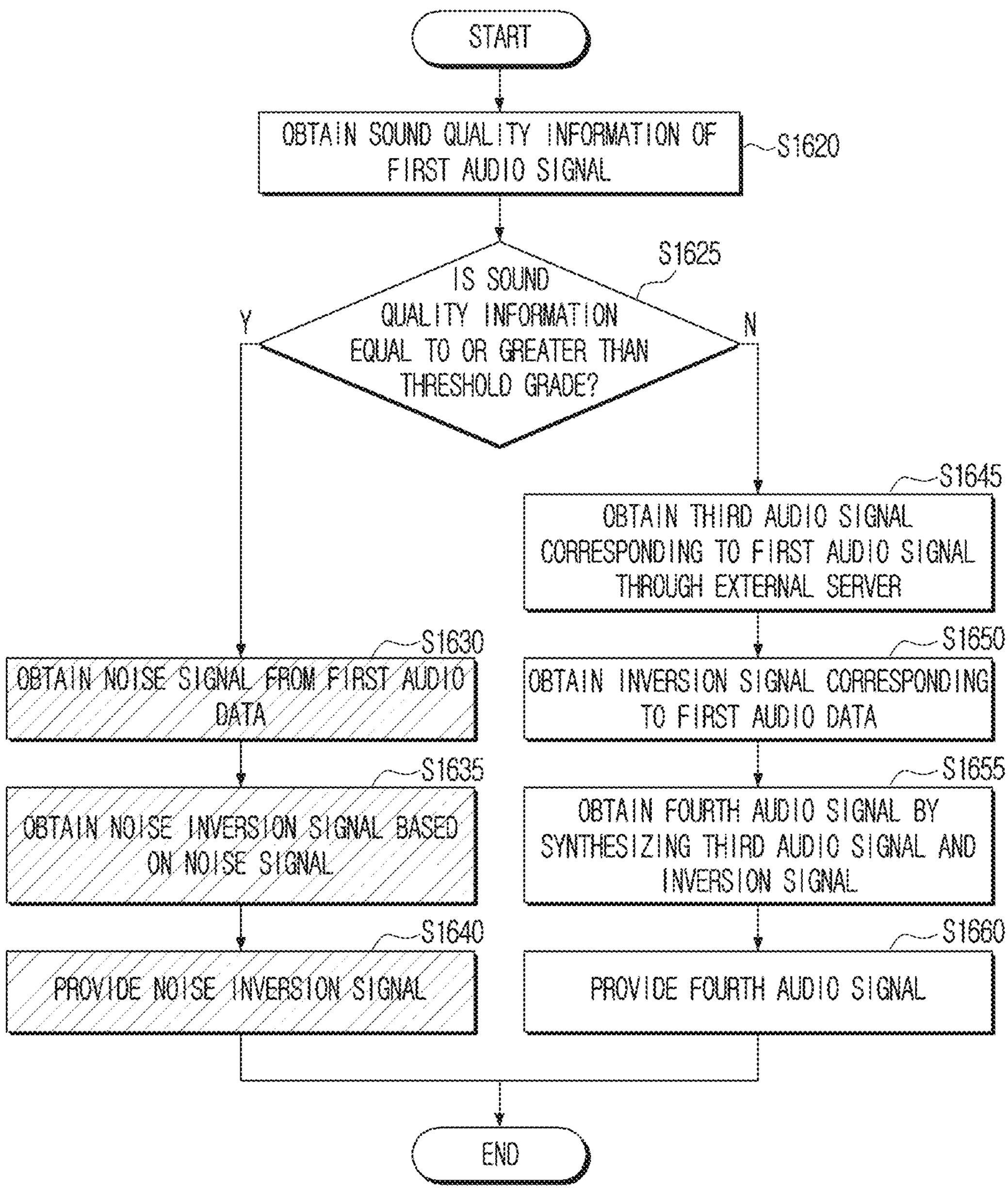
FIG. 16 is a view provided to explain an operation of filtering only noise according to an example embodiment.

FIG. 16 is a view provided to explain an operation of filtering only noise according to an embodiment.

Steps S1620, S1625, S1645, S1650, S1655, and S1660 of FIG. 16 may correspond to steps S620, S625, S645, S650, S655, and S660 of FIG. 6. Redundant descriptions will be omitted.

When the sound quality information is equal to or greater than a threshold grade (S1625-Y), the electronic apparatus 100 may obtain (or extract) a noise signal from the first audio data (S1630). The electronic apparatus 100 may obtain a noise inversion signal based on the noise signal (S1635).

The inversion signal described in FIG. 6 may be a signal for attenuating the entire ambient sound included in the first audio data.

The noise inversion signal described in FIG. 16 may be a signal for attenuating only noise in the entire ambient sound included in the first audio data.

The electronic apparatus 100 may provide the noise inversion signal (S1640). When the noise inversion signal is provided, the electronic apparatus 100 may attenuate noise in the ambient sound. The user may selectively listen to a de-noised first audio signal among various sound included in the ambient sound.

Figure 17:
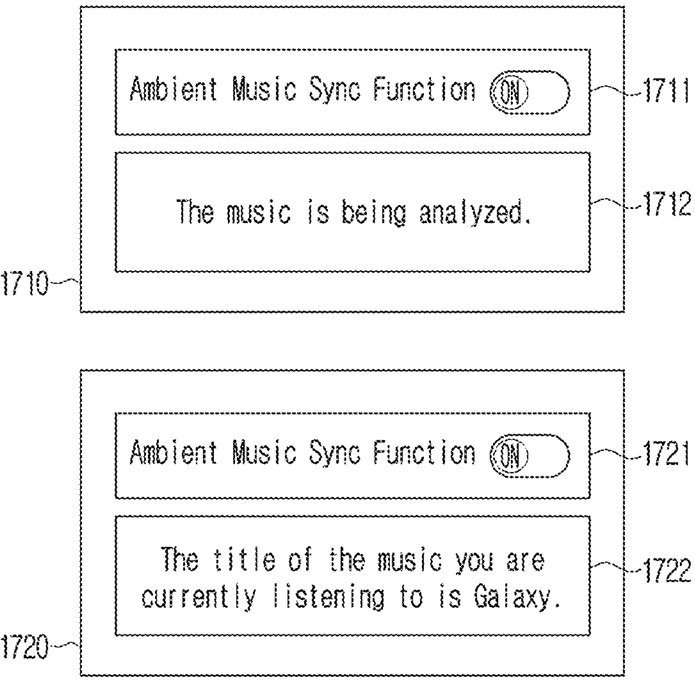
FIG. 17 is a view provided to explain a User Interface (UI) related to a content providing service according to an example embodiment.

FIG. 17 is a view provided to explain a User Interface (UI) related to a content providing service according to an embodiment.

The electronic apparatus 100 may provide a screen 1710 that indicates whether a function that provides content included in ambient sound is performed. The screen 1710 may include at least one of a UI 1711 for determining whether to perform the function or a UI 1712 for describing an operation performed by the electronic apparatus 100.

The electronic apparatus 100 may provide a screen 1720 that provides information about content included in the ambient sound. The screen 1720 may include at least one of a UI 1721 for determining whether to perform a function or a UI 1722 for describing retrieved content.

FIG. 18 is a view provided to explain an operation of providing an audio signal using the sound device 200 according to an embodiment.

Steps S1805 and S1815 of FIG. 18 may correspond to steps S505 and S515 of FIG. 5. Steps S1820, S1825, S1830, S1835, and S1840 of FIG. 18 may correspond to steps S620, S625, S630, S635, and S640 of FIG. 6. Redundant descriptions will be omitted. Some of the operations performed in FIGS. 5 and 6 may be performed in the sound device 200.

Referring to FIG. 18, the sound device 200 may obtain first audio data about ambient sound (S1805). The sound device 200 may transmit the first audio data to the electronic apparatus 100 (S1806).

The electronic apparatus 100 may receive the first audio data from the sound device 200. The electronic apparatus 100 may obtain the first audio signal from the first audio data (S1815). The electronic apparatus 100 may obtain sound quality information of the first audio signal (S1820).

The electronic apparatus 100 may determine whether the sound quality information of the first audio signal is equal to or greater than a threshold grade (S1825).

When the sound quality information of the first audio signal is equal to or greater than the threshold grade (S1825-Y), the electronic apparatus 100 may obtain an inversion signal corresponding to the first audio data (S1830). The electronic apparatus 100 may obtain the second audio signal by synthesizing the first audio signal and the inversion signal (S1835).

The electronic apparatus 100 may transmit the second audio signal to the sound device 200 (S1836). The sound device 200 may receive the second audio signal from the electronic apparatus 100. The sound device 200 may provide the second audio signal (S1840).

When the sound quality information of the first audio signal is not equal to or greater than the threshold grade (S1825-N), the electronic apparatus 100 may transmit the first audio signal to the external server 300 (S1841). The electronic apparatus 100 may request high-quality data (or signal) corresponding to the first audio signal from the external server 300. An operation in this regard will be described with reference to FIG. 19.

FIG. 19 is a view provided to explain an operation of providing an audio signal using the sound device 200 according to an embodiment.

Steps S1905 and S1915 of FIG. 19 may correspond to steps S505 and S515 of FIG. 5. Steps S1920, S1925, S1945, S1950, S1955, and S1960 of FIG. 19 may correspond to steps S620, S625, S645, S650, S655, and S660 of FIG. 6. Redundant descriptions will be omitted. Some of the operations performed in FIGS. 5 and 6 may be performed in the sound device 200.

Steps S1905, S1906, S1915, S1920, S1925, and S1941 of FIG. 19 may correspond to steps S1805, S1806, S1815, S1820, S1825, and S1841 of FIG. 18. Redundant descriptions will be omitted.

When the sound quality information is not equal to or greater than the threshold grade (S1925-N), the electronic apparatus 100 may transmit the first audio signal to the external server 300 (S1941). The electronic apparatus 100 may request original data or high-quality data corresponding to the first audio signal from the external server 300. The electronic apparatus 100 may transmit a data packet including the first audio signal and a control signal requesting data corresponding to the first audio signal to the external server 300.

The external server 300 may receive the first audio signal from the electronic apparatus 100. The external server 300 may obtain the third audio signal corresponding to the first audio signal (S1945). The external server 300 may transmit the third audio signal to the electronic apparatus 100 (S1946).

The electronic apparatus 100 may receive the third audio signal from the external server 300. The electronic apparatus 100 may obtain an inversion signal corresponding to the first audio signal (S1950). The electronic apparatus 100 may obtain the fourth audio signal by synthesizing the third audio signal and the inversion signal (S1955). The electronic apparatus 100 may transmit the fourth audio signal to the sound device 200 (S1956).

The sound device 200 may receive the fourth audio signal from the electronic apparatus 100. The sound device 200 may provide the fourth audio signal (S1960).

FIG. 20 is a view provided to explain an operation of providing an audio signal using the sound device 200 according to an embodiment.

Steps S2005 and S2015 of FIG. 20 may correspond to steps S505 and S515 of FIG. 5. Steps S2020, S2025, S2030, S2035, S2040, S2045, S2050, S2055, and S2060 of FIG. 20 may correspond to steps S620, S625, S630, S635, S640, S645, S650, S655, and S660. Redundant descriptions will be omitted. Some of the operations of FIG. 6 may be performed in the sound device 200.

The sound device 200 may obtain first audio data about ambient sound (S2005). The sound device 200 may obtain the first audio signal from the first audio data (S2015). The sound device 200 may obtain sound quality information of the first audio signal (S2020). The sound device 200 may determine whether the sound quality information is equal to or greater than a threshold grade (S2025).

When the sound quality information is equal to or greater than the threshold grade (S2025-Y), the sound device 200 may obtain an inversion signal corresponding to the first audio data (S2030). The sound device 200 may obtain the second audio signal by synthesizing the first audio signal and the inversion signal (S2035). The sound device 200 may provide the second audio signal (S2040).

When the sound quality information is not equal to or greater than the threshold grade (S2025-N), the sound device 200 may transmit the first audio signal to the external server 300 (S2041).

The external server 300 may receive the first audio signal from the sound device 200. The external server 300 may obtain the third audio signal corresponding to the first audio signal (S2045). The external server 300 may transmit the third audio signal to the sound device 200 (S2046).

The sound device 200 may receive the third audio signal from the external server 300. The sound device 200 may obtain an inversion signal corresponding to the first audio data (S2050). The sound device 200 may obtain the fourth audio signal by synthesizing the third audio signal and the inversion signal (S2055). The sound device 200 may provide the fourth audio signal (S2060).

Figure 21:
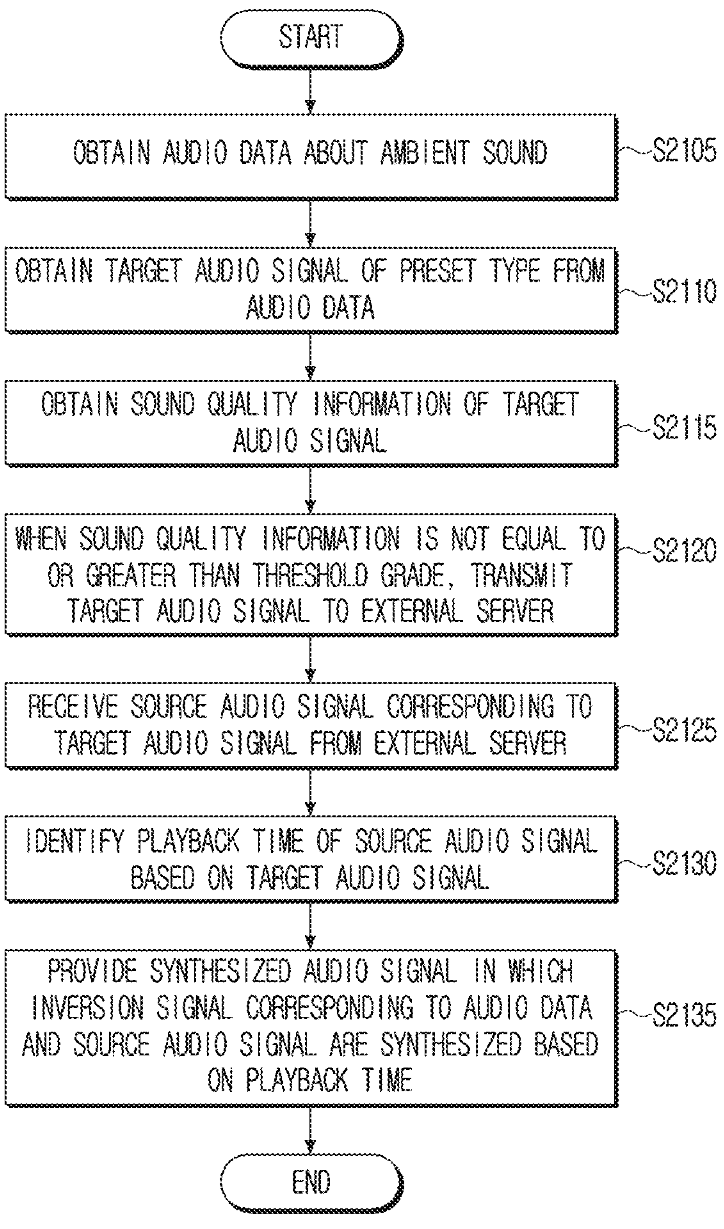
FIG. 21 is a view provided to explain an example embodiment.

FIG. 21 is a view provided to explain an embodiment. Each embodiment herein may be used in combination with any other embodiment(s) described herein.

Referring to FIG. 21, a controlling method of an electronic apparatus that performs communication with an external server includes obtaining audio data about ambient sound (S2105), obtaining a target audio signal of a preset type from the audio data (S2110), obtaining sound quality information of the target audio signal (S2115), when the sound quality information is not equal to or greater than a threshold grade, transmitting the target audio signal to the external server (S2120), receiving a source audio signal corresponding to the target audio signal from the external server (S2125), identifying a playback time of the source audio signal based on the target audio signal (S2130), and providing a synthesized audio signal in which an inversion signal corresponding to the audio data and the source audio signal are synthesized based on the playback time (S2135).

The step of obtaining sound quality information (S2115) may include obtaining a target audio signal and a noise signal from the audio data, obtaining a Signal-to-Noise Ratio (SNR) based on the target audio signal and the noise signal, and obtaining sound quality information based on the Signal-to-Noise Ratio (SNR).

The step of transmitting the target audio signal to the external server (S2120) may include, when the Signal-to-Noise Ratio (SNR) is less than a threshold value, transmitting the target audio signal to the external server.

The step of obtaining sound quality information (S2115) may include determining a sound quality grade of the first audio signal based on the Signal-to-Noise Ratio (SNR) and a grade table for sound quality stored in the electronic apparatus, and obtaining sound quality information including the sound quality grade. “Based on” as used herein covers based at least on.

The controlling method may further include the step of obtaining an inversion signal by inverting the phase of a signal included in the audio data to attenuate ambient sound.

The step of providing a synthesized audio signal (S2135) may include comparing a waveform of the target audio signal and a waveform of the source audio signal to determine a playback time of the source audio signal, synthesizing an area corresponding to the playback time among the inversion signal and the entire area of the source audio signal to obtain a synthesized audio signal, and providing the synthesized audio signal.

The controlling method may further include the step of transmitting the synthesized audio signal to an external sound device.

The external sound device is a wireless earphone or a wireless headphone, and the step of transmitting the synthesized audio signal to the external sound device (S2120) may include transmitting the synthesized audio signal to the external sound device through a Bluetooth communication module, comprising communication circuitry, included in the electronic apparatus.

The synthesized audio signal is a first synthesized audio signal, and the controlling method may further include, when the sound quality information is equal to or greater than the threshold grade, obtaining a second synthesized audio signal in which the inversion signal corresponding to the audio data and the target audio signal are synthesized and providing the second synthesized audio signal.

The controlling method may further include, when the output method of the target audio signal is a mono type, obtaining a conversion signal by converting the target audio signal to a stereo type, and the obtaining a second synthesized audio signal may include obtaining the second synthesized audio signal by synthesizing the conversion signal and the inversion signal.

The methods according to the above-described various embodiments may be implemented in the form of an application that can be installed in the existing electronic apparatus.

The methods according to the above-described various embodiments may be implemented by software upgrade for the existing electronic apparatuses, or by hardware upgrade alone.

It is also possible for the methods according to the above-described various embodiments to be performed through an embedded server provided in the electronic apparatus, or through at least one external server among the electronic apparatus and the display device.

Meanwhile, according to an embodiment, the above-described various embodiments may be implemented in software including an instruction stored in a machine-readable storage medium that can be read by a machine (e.g., a computer). The machine may be a device that invokes the stored instruction from the storage medium and be operated based on the invoked instruction, and may include a robot according to embodiments. In case that the instruction is executed by the processor 140, the processor 140 may directly perform a function corresponding to the instruction using other components under the control of the processor 140. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

Each "processor" herein includes processing circuitry; and/or may include multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, methods according to various embodiments described above may be provided in a computer program product. The computer program product is a commodity, and may be traded between a seller and a buyer. The computer program product may be distributed in the form of a device-readable storage medium (e.g., compact disc read only memory (CD-ROM)) or online through an application store (e.g., PlayStore™). In the case of online distribution, at least a portion of the computer program product may be stored, or at least temporarily generated, in a storage medium, such as a manufacturer's server, an application store's server, or the memory of a relay server.

Each of the components (e.g., modules or programs) according to the various embodiments may consist of a single entity or a plurality of entities, and some of the corresponding sub-components described above may be omitted or other sub-components may be further included in the various embodiments. Alternatively or additionally, some of the components (e.g., the modules or the programs) may be integrated into one entity, and may perform functions performed by the respective corresponding components before being integrated in the same or similar manner. Operations performed by modules, programs or other components according to the various embodiments may be executed in a sequential manner, a parallel manner, an iterative manner or a heuristic manner, and at least some of the operations may be performed in a different order or be omitted, or other operations may be added.

Hereinabove, although preferred embodiments have been shown and described above, the disclosure is not limited to the specific embodiments described above, and various modifications may be made by one of ordinary skill in the art without departing from the disclosure as claimed in the claims, and such modifications are not to be understood in isolation from the technical ideas or prospect of the disclosure. While the disclosure has been illustrated and described with reference to various embodiments, it will be understood that the various embodiments are intended to be illustrative, not limiting. It will further be understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

The invention claimed is:

1. An electronic apparatus comprising:

a memory;

a communication interface, comprising communication circuitry, configured to perform communication with an external server; and at least one processor comprising processing circuitry, and configured to:

obtain audio data for ambient sound;

obtain a target audio signal of a preset type from the audio data;

obtain sound quality information of the target audio signal;

based on the sound quality information being not equal to or greater than a threshold grade, control to transmit the target audio signal to the external server via the communication interface;

receive a source audio signal corresponding to the target audio signal from the external server via the communication interface;

identify a playback time of the source audio signal based on the target audio signal; and provide a synthesized audio signal in which an inversion signal corresponding to the audio data and the source audio signal are synthesized based on the playback time.

2. The electronic apparatus as claimed in claim 1, wherein at least one processor is individually and/or collectively configured to:

obtain the target audio signal and a noise signal from the audio data;

obtain a Signal-to-Noise Ratio (SNR) based on the target audio signal and the noise signal; and obtain the sound quality information based on the Signal-to-Noise Ratio (SNR).

3. The electronic apparatus as claimed in claim 2, wherein at least one processor is individually and/or collectively configured to, based on the Signal-to-Noise Ratio (SNR) being less than a threshold value, control to transmit the target audio signal to the external server via the communication interface.

4. The electronic apparatus as claimed in claim 2, wherein at least one processor is individually and/or collectively configured to:

determine a sound quality grade of the target audio signal based on the Signal-to-Noise Ratio (SNR) and a grade table for sound quality stored in the memory; and obtain the sound quality information including the sound quality grade.

5. The electronic apparatus as claimed in claim 1, wherein at least one processor is individually and/or collectively configured to obtain the inversion signal by inversing a phase of a signal included in the audio data to attenuate the ambient sound.

6. The electronic apparatus as claimed in claim 1, wherein at least one processor is individually and/or collectively configured to:

determine the playback time of the source audio signal by comparing a waveform of the target audio signal and a waveform of the source audio signal;

obtain the synthesized audio signal by synthesizing the inversion signal and an area corresponding to the playback time among an entire area of the source audio signal; and provide the synthesized audio signal.

7. The electronic apparatus as claimed in claim 1, wherein at least one processor is individually and/or collectively configured to control to transmit the synthesized audio signal to an external sound device via the communication interface.

8. The electronic apparatus as claimed in claim 7, wherein the external sound device is a wireless earphone and/or a wireless headphone; and wherein at least one processor is individually and/or collectively configured to control to transmit the synthesized audio signal to the external sound device via a Bluetooth communication module, comprising communication circuitry, included in the communication interface.

9. The electronic apparatus as claimed in claim 1, wherein the synthesized audio signal is a first synthesized audio signal;

wherein at least one processor is individually and/or collectively configured to, based on the sound quality information being equal to or greater than a threshold grade, obtain a second synthesized audio signal in which the inversion signal corresponding to the audio data and the target audio signal are synthesized; and provide the second synthesized audio signal.

10. The electronic apparatus as claimed in claim 9, wherein at least one processor is individually and/or collectively configured to, based on an output method of the target audio signal being a mono type, obtain a conversion signal by converting the target audio signal to a stereo type; and obtain the second synthesized audio signal by synthesizing the conversion signal and the inversion signal.

11. A controlling method of an electronic apparatus that performs communication with an external server, the method comprising:

obtaining audio data for ambient sound;

obtaining a target audio signal of a preset type from the audio data;

obtaining sound quality information of the target audio signal;

based on the sound quality information being not equal to or greater than a threshold grade, transmitting the target audio signal to the external server;

receiving a source audio signal corresponding to the target audio signal from the external server;

identifying a playback time of the source audio signal based on the target audio signal; and providing a synthesized audio signal in which an inversion signal corresponding to the audio data and the source audio signal are synthesized based on the playback time.

12. The method as claimed in claim 11, wherein the obtaining sound quality information comprises:

obtaining the target audio signal and a noise signal from the audio data;

obtaining a Signal-to-Noise Ratio (SNR) based on the target audio signal and the noise signal; and obtaining the sound quality information based on the Signal-to-Noise Ratio (SNR).

13. The method as claimed in claim 12, wherein the transmitting the target audio signal to the external server comprises, based on the Signal-to-Noise Ratio (SNR) being less than a threshold value, transmitting the target audio signal to the external server.

14. The method as claimed in claim 12, wherein the obtaining sound quality information comprises:

determining a sound quality grade of the target audio signal based on the Signal-to-Noise Ratio (SNR) and a grade table for sound quality stored in the electronic apparatus; and obtaining the sound quality information including the sound quality grade.

15. The method as claimed in claim 11, further comprising:

obtaining the inversion signal by inversing a phase of a signal included in the audio data to attenuate the ambient sound.

* * * * *